United States Patent
Ponziani et al.

(10) Patent No.: US 7,188,466 B2
(45) Date of Patent: *Mar. 13, 2007

(54) PASSIVE, HIGH-TEMPERATURE AMPLIFIER FOR AMPLIFYING SPARK SIGNALS DETECTED IN IGNITER IN GAS TURBINE ENGINE

(75) Inventors: Robert L. Ponziani, West Chester, OH (US); Roy Earwood, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 223 days.

This patent is subject to a terminal disclaimer.

(21) Appl. No.: 10/775,876

(22) Filed: Feb. 10, 2004

(65) Prior Publication Data

US 2006/0137354 A1    Jun. 29, 2006

(51) Int. Cl.
*F02C 7/226* (2006.01)
*F02P 17/12* (2006.01)

(52) U.S. Cl. .............................. 60/39.827; 123/169 E; 313/118

(58) Field of Classification Search ............ 60/39.827; 313/125, 128, 140; 123/169 E, 169 EI
See application file for complete search history.

(56) References Cited

U.S. PATENT DOCUMENTS

| | | | |
|---|---|---|---|
| 2,969,500 A * | 1/1961 | Andert | 324/395 |
| 3,967,149 A * | 6/1976 | Eaton et al. | 313/141 |
| 4,284,054 A * | 8/1981 | Kumagai et al. | 123/536 |
| 4,814,664 A * | 3/1989 | Rothenbuhler | 313/131 R |
| 4,914,344 A * | 4/1990 | Watanabe et al. | 313/141 |
| 5,155,437 A | 10/1992 | Frus | |
| 5,194,813 A | 3/1993 | Hannah et al. | |
| 5,343,154 A | 8/1994 | Frus | |
| 5,491,416 A * | 2/1996 | Klimstra et al. | 324/393 |
| 5,508,618 A * | 4/1996 | Owens | 324/402 |
| 5,523,691 A | 6/1996 | Frus | |
| 5,587,630 A * | 12/1996 | Dooley | 315/209 T |
| 5,606,118 A | 2/1997 | Muth et al. | |
| 5,612,586 A | 3/1997 | Benedikt et al. | |
| 5,675,257 A | 10/1997 | Frus | |
| 6,362,562 B1 | 3/2002 | Rossi | |
| 6,380,664 B1 | 4/2002 | Pollner | |
| 6,505,605 B2 | 1/2003 | Yamada | |
| 6,531,809 B1 | 3/2003 | Benedikt et al. | |

\* cited by examiner

*Primary Examiner*—Ted Kim
(74) *Attorney, Agent, or Firm*—William Scott Andes; Gregory Welte

(57) ABSTRACT

A system for detecting spark in an igniter for a gas turbine engine. An igniter generates a plasma, or spark, somewhat similar to an automotive spark plug. In the invention, an inductive pick-up is positioned adjacent the igniter, to detect current pulses in the igniter, to thereby infer the presence of spark. The signal produced is small, and requires amplification. However, the environment is hot, often exceeding 400 degrees F. The invention utilizes an amplifier composed of passive components, in the form of an RLC circuit.

12 Claims, 22 Drawing Sheets

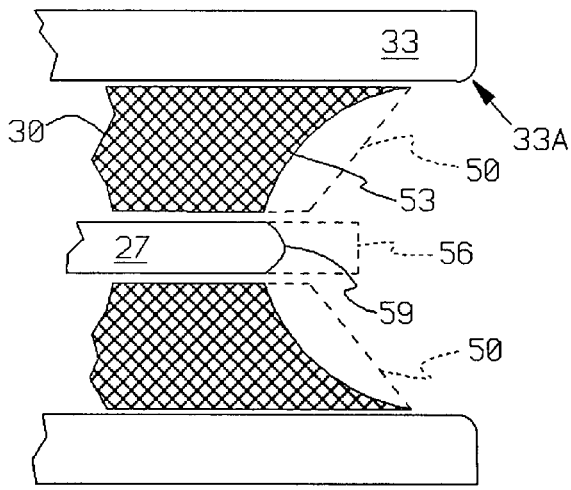
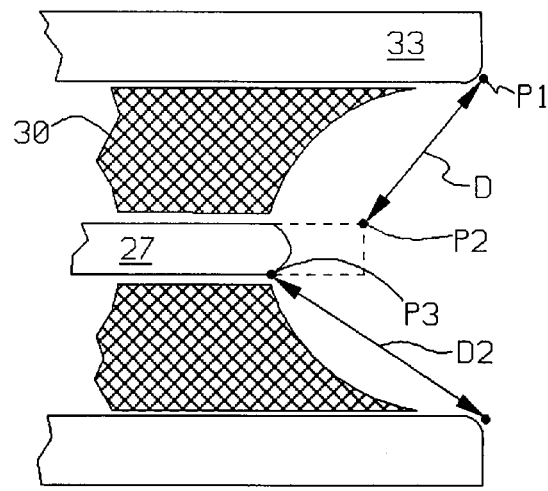
FIG 5
FIG 6

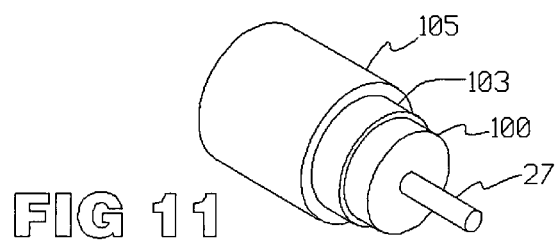
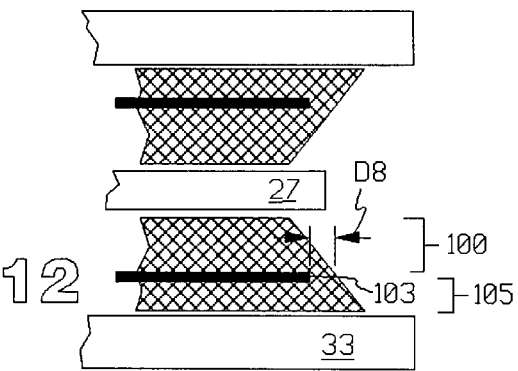
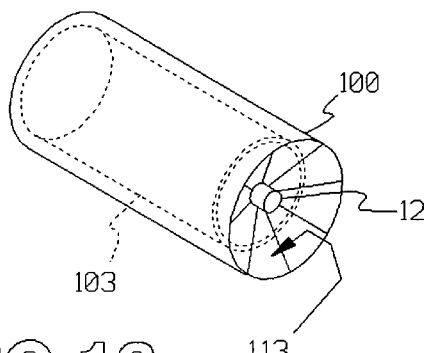
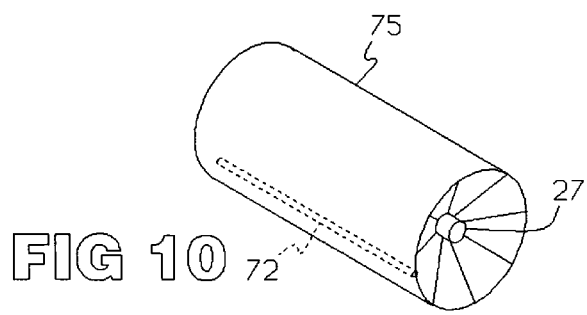

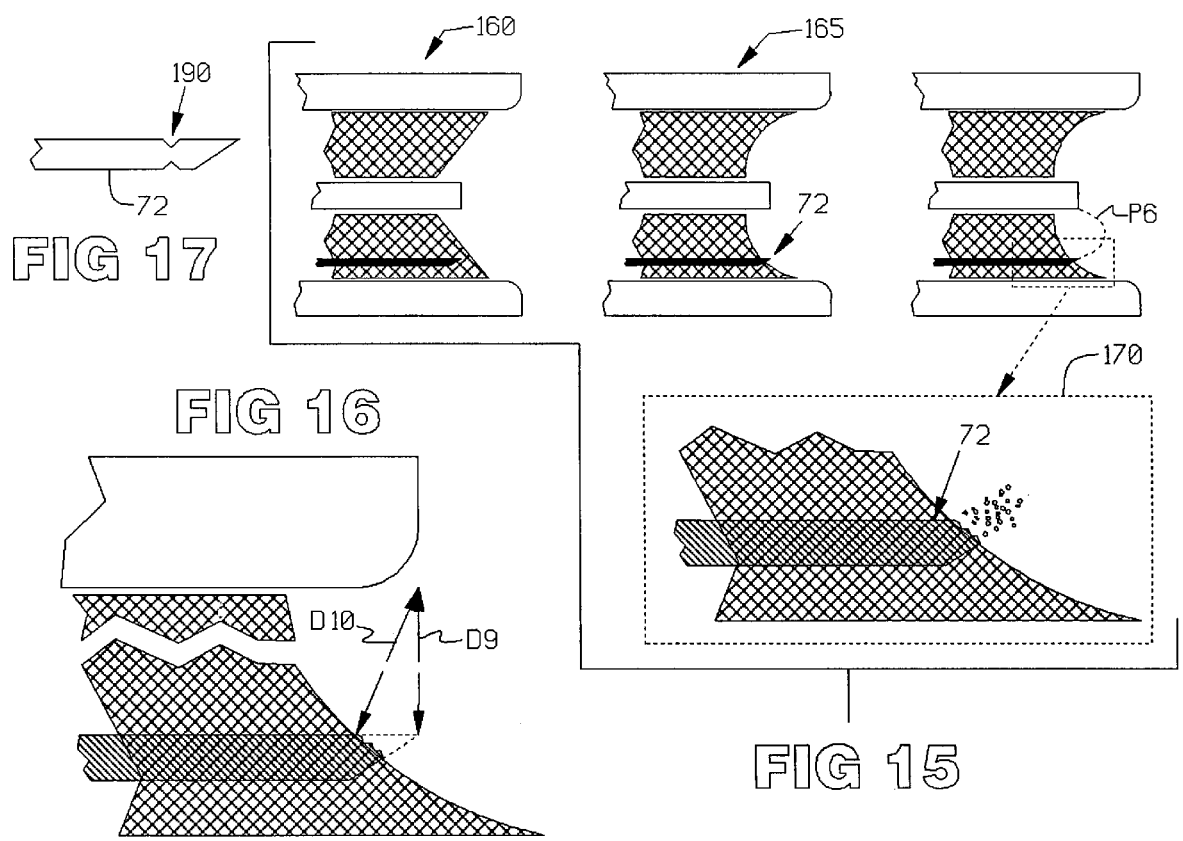

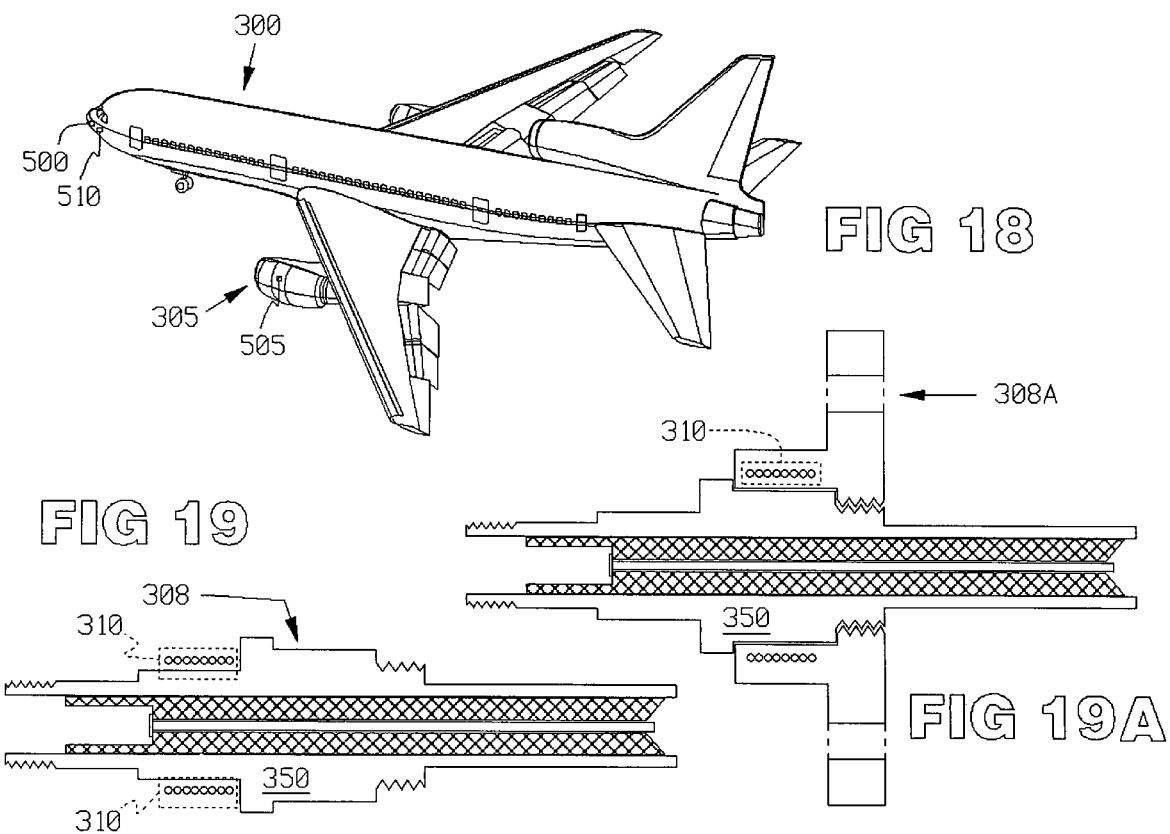

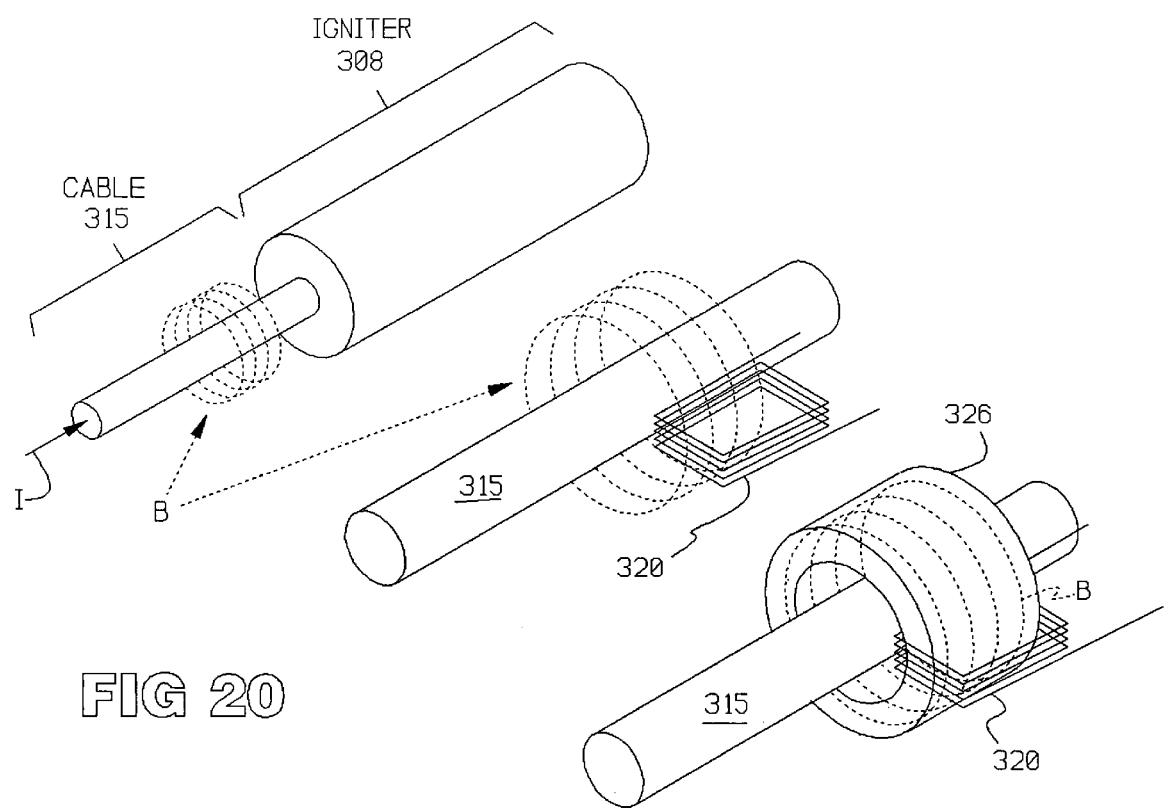

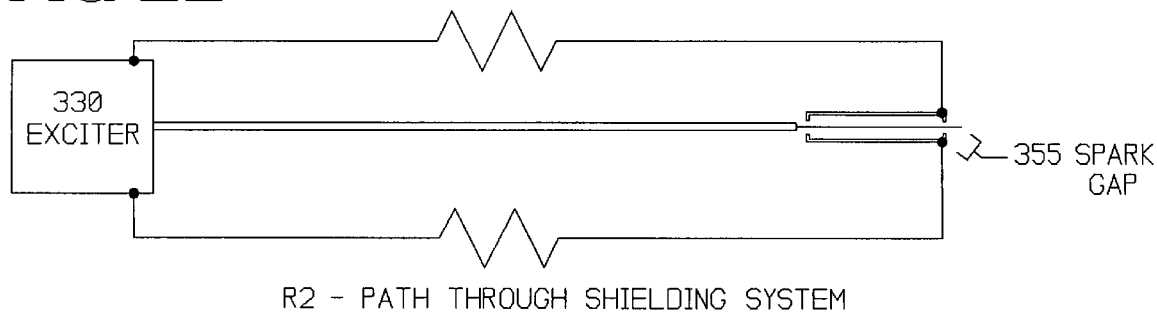
FIG 22  R1 - PATH THROUGH SYSTEM GROUND
330 EXCITER
355 SPARK GAP
R2 - PATH THROUGH SHIELDING SYSTEM
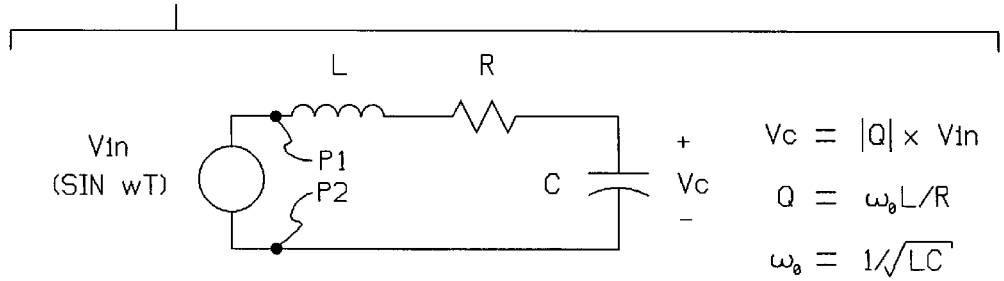
FIG 23 PRIOR ART
$V_c = |Q| \times V_{in}$
$Q = \omega_0 L/R$
$\omega_0 = 1/\sqrt{LC}$

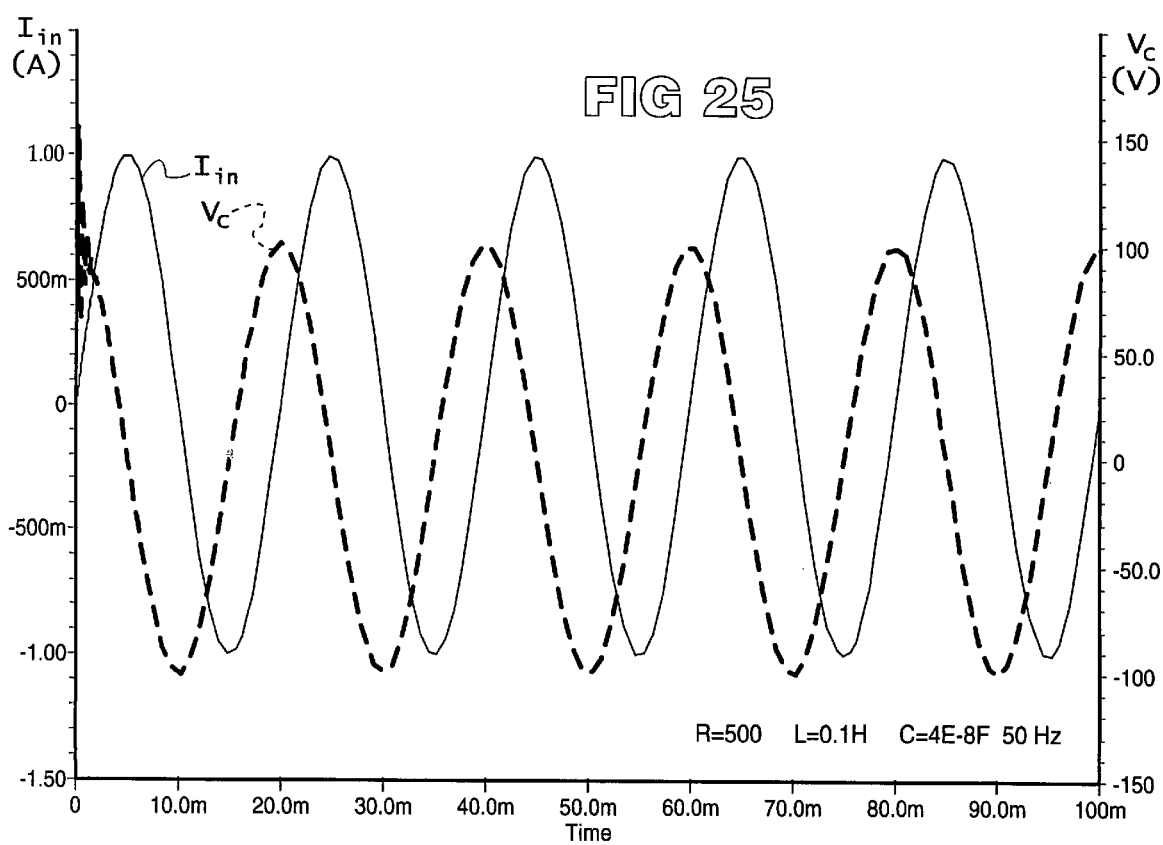

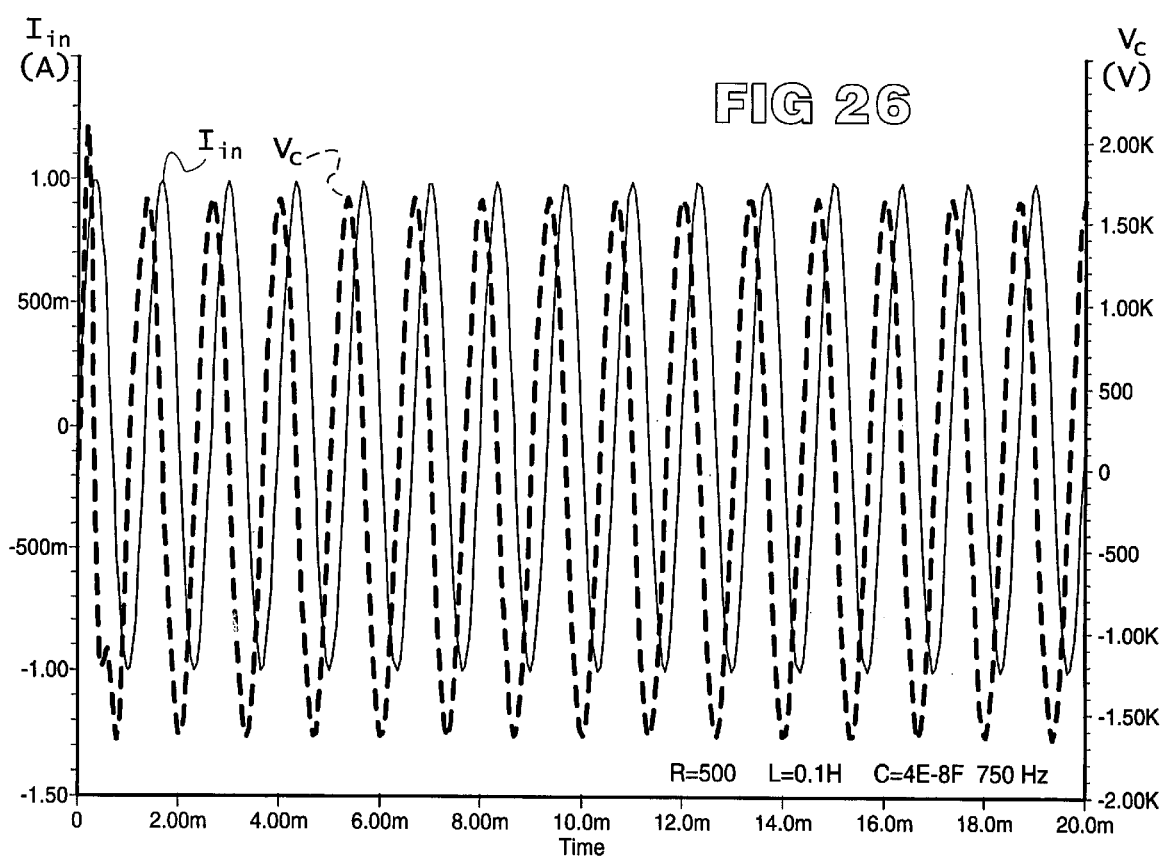

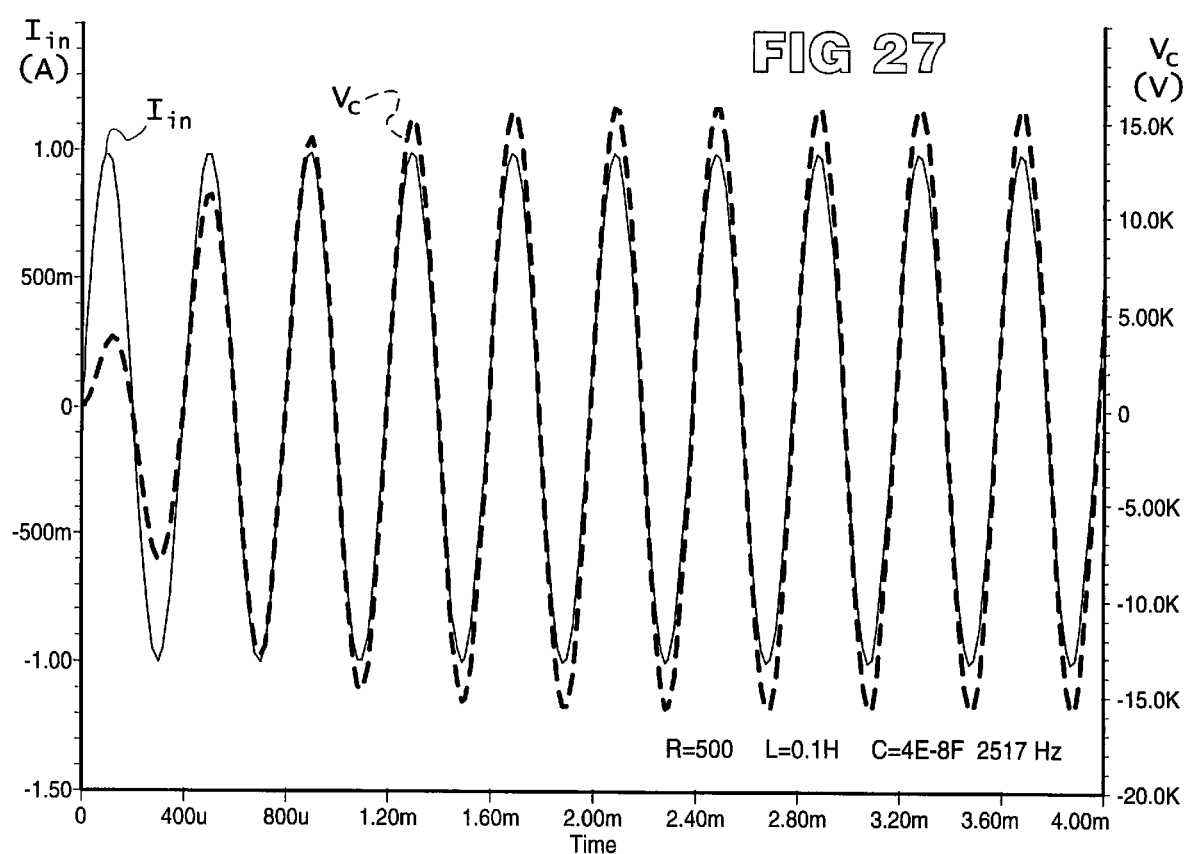

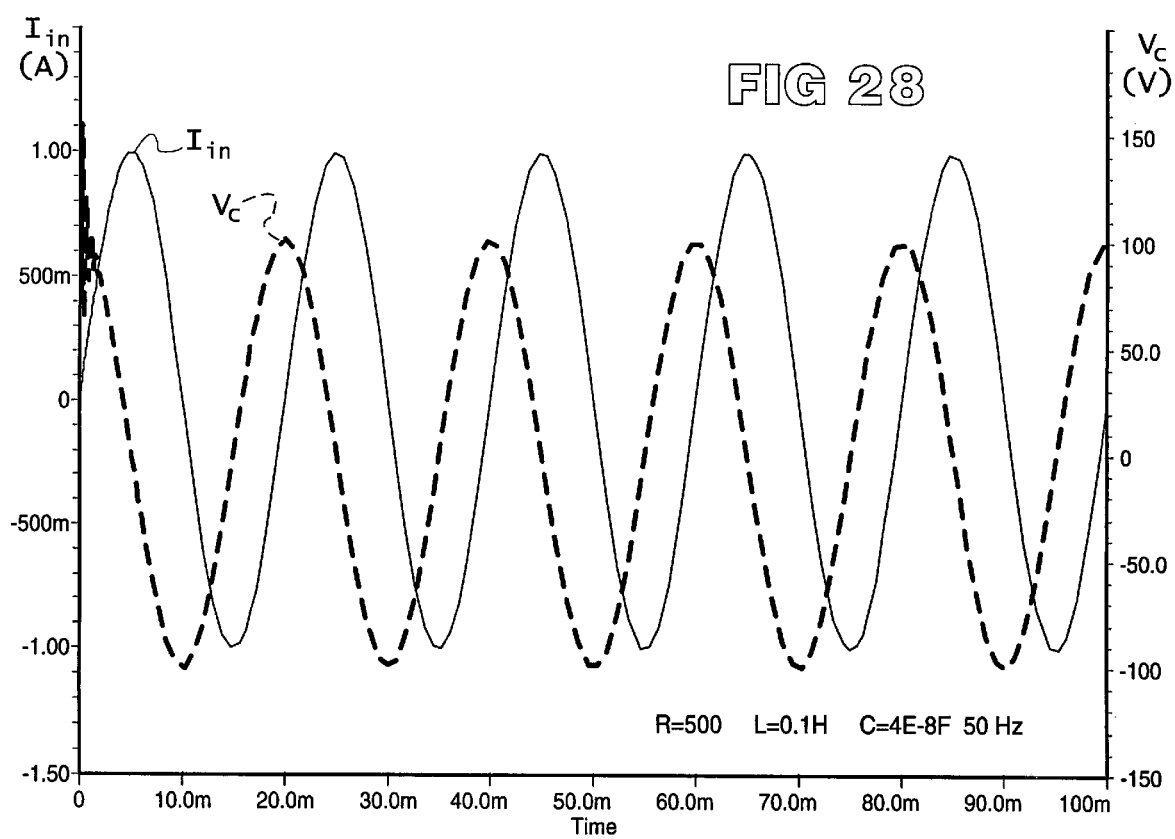

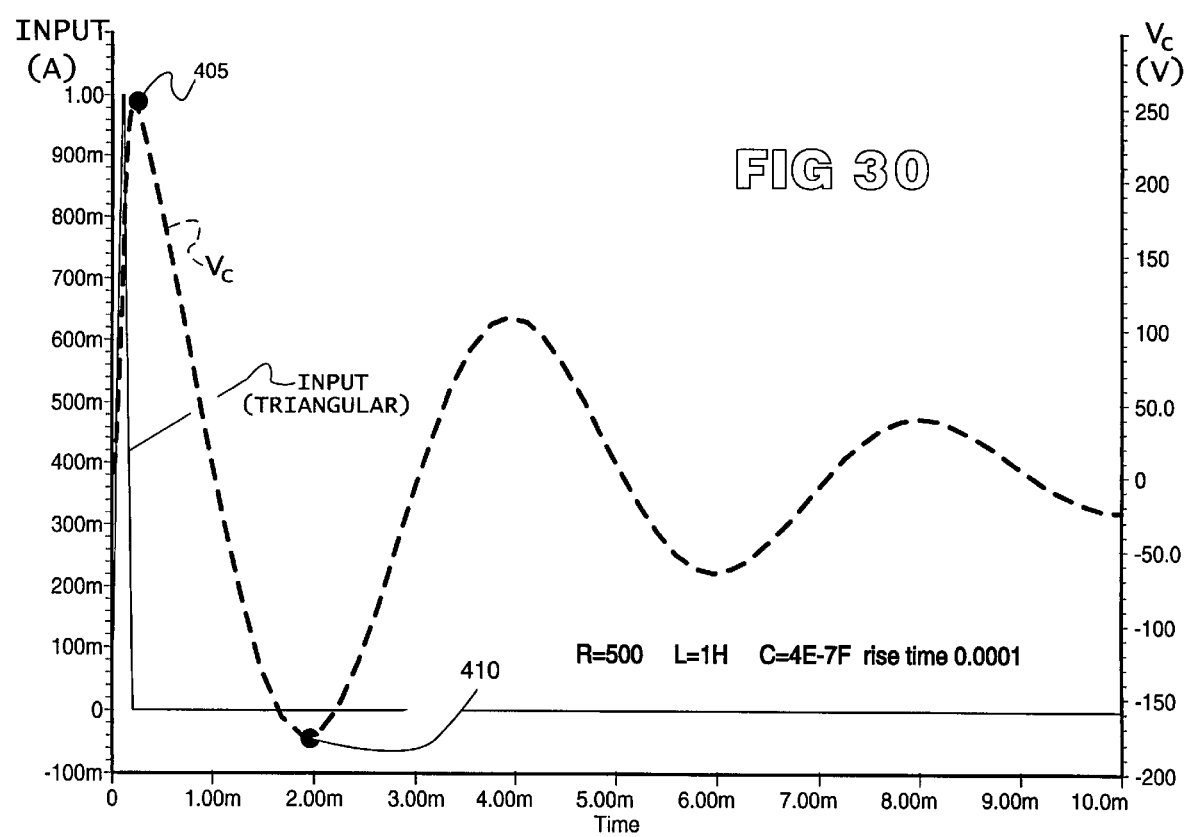

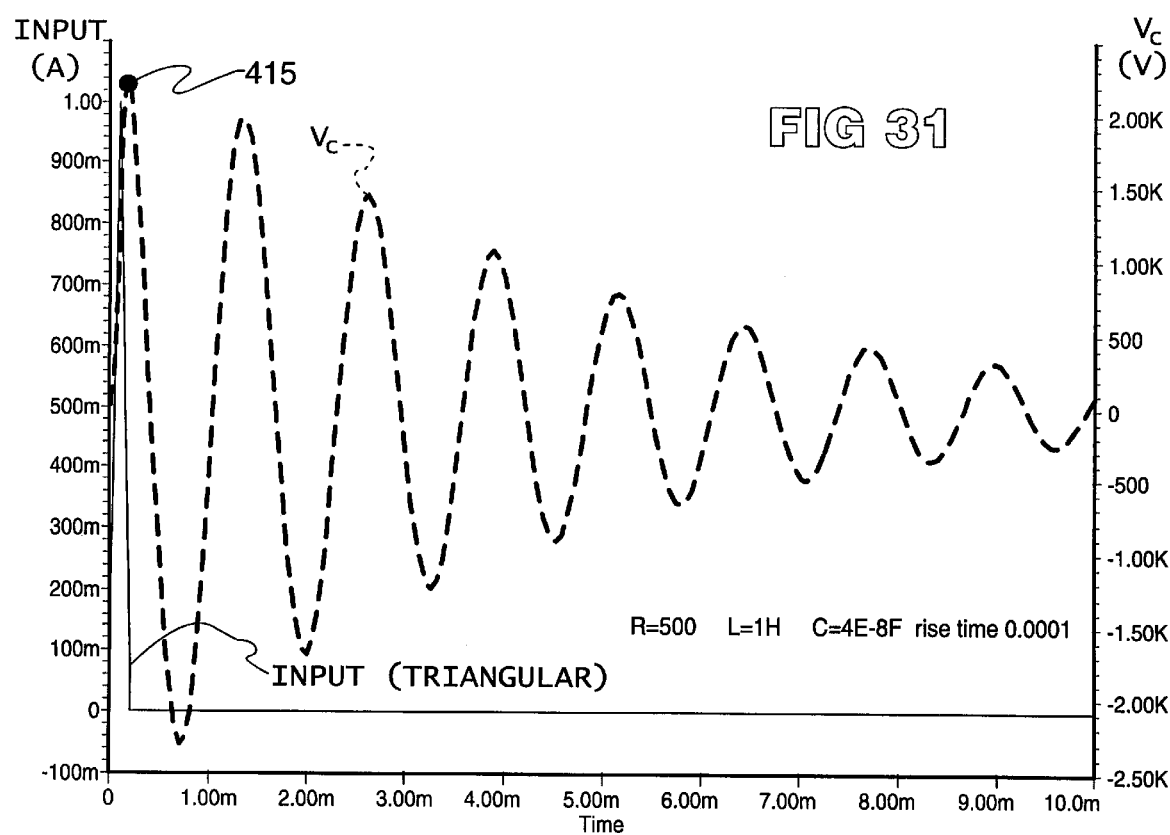

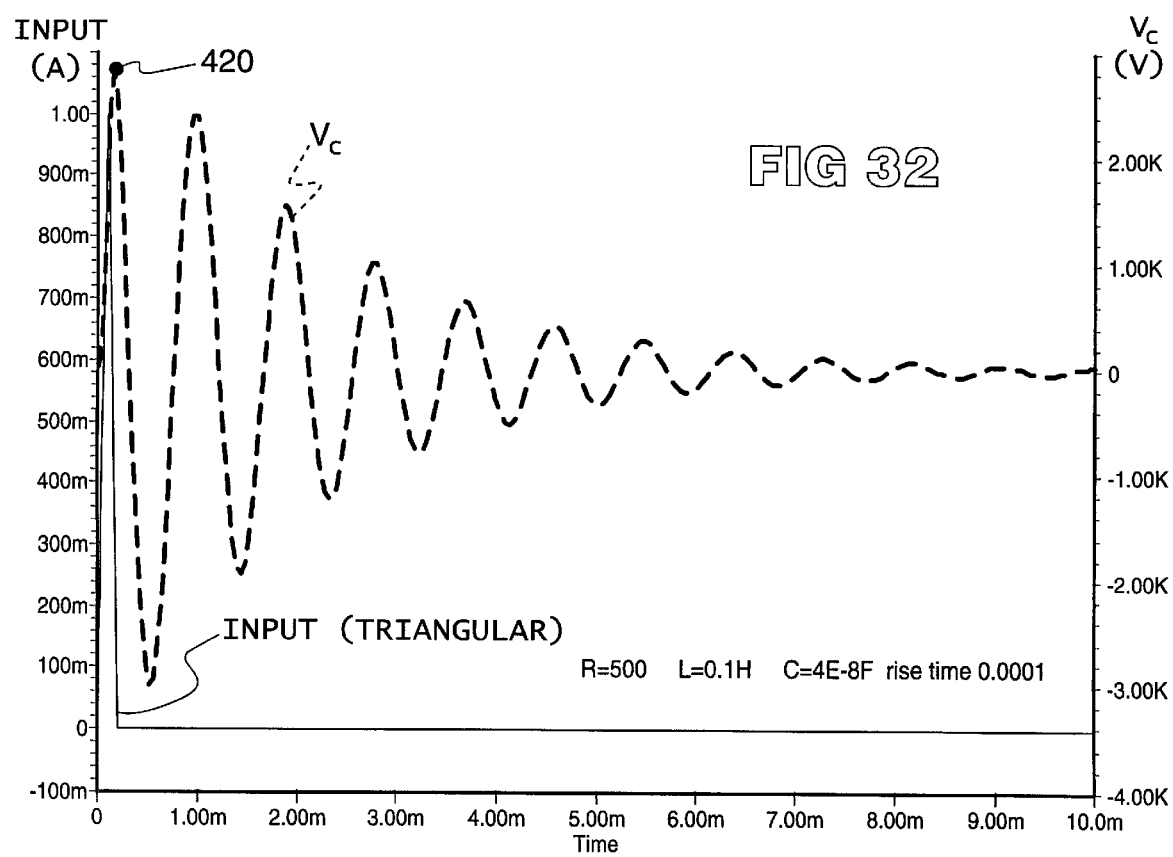

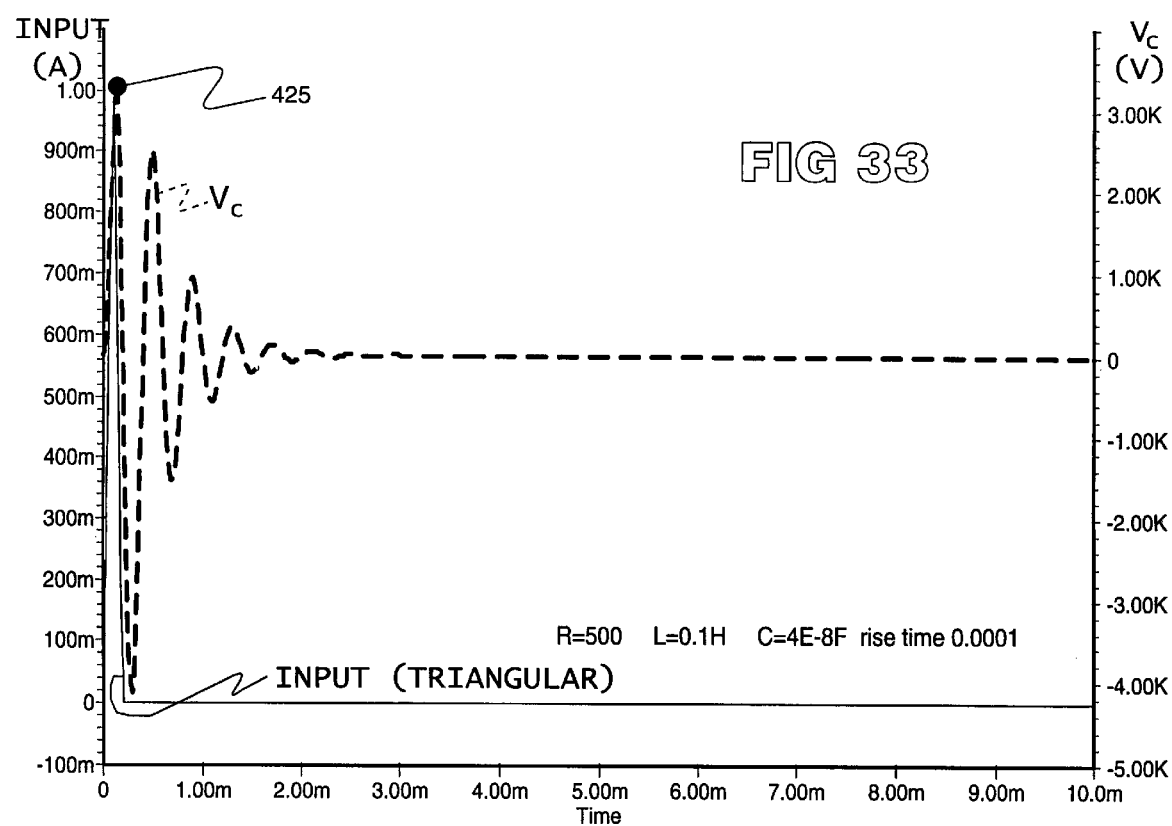

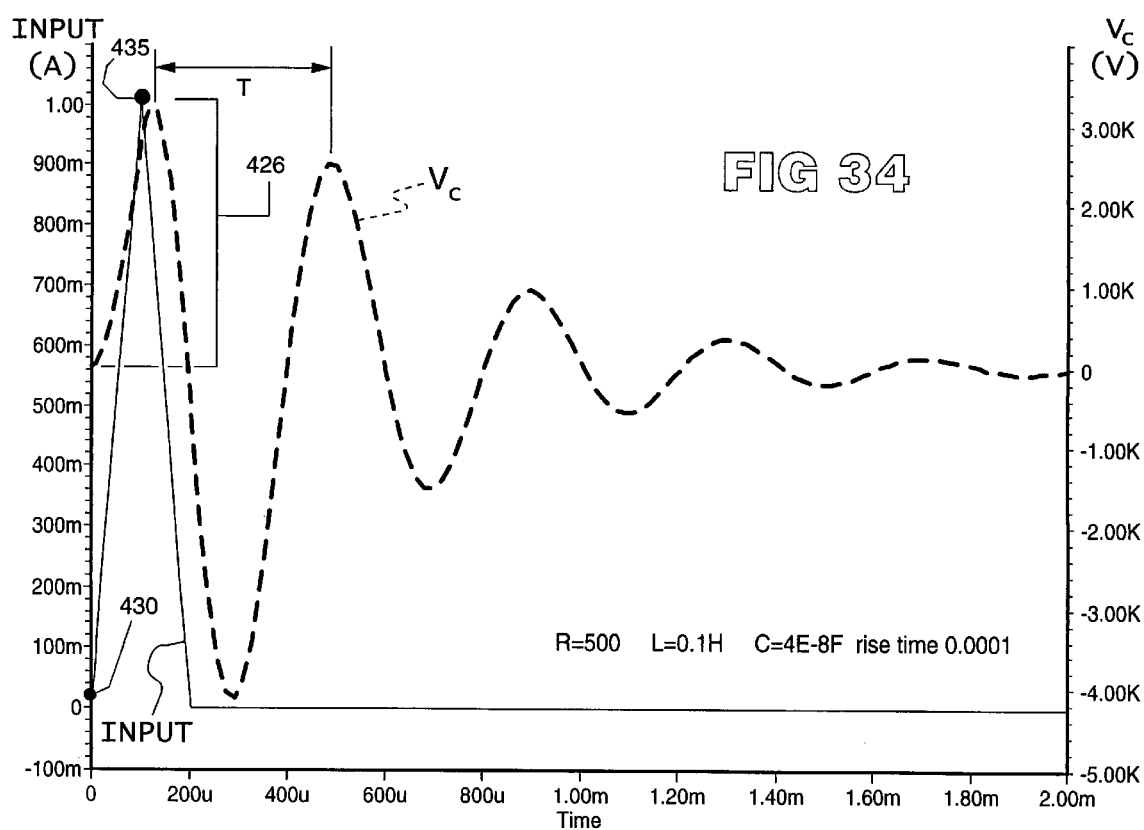

PASSIVE, HIGH-TEMPERATURE AMPLIFIER FOR AMPLIFYING SPARK SIGNALS DETECTED IN IGNITER IN GAS TURBINE ENGINE

CROSS REFERENCE TO RELATED APPLICATIONS

This Application is related to subject matter in the following patent applications, which are of common inventorship and filed concurrently herewith:

SENSOR FOR DETECTION OF SPARK IN IGNITER IN GAS TURBINE ENGINE, Ser. No. 10/775,887;

METHOD OF INFORMING PILOT OF AIRCRAFT OF SPARK DETECTED IN GAS TURBINE ENGINE, Ser. No. 10/775,864;

INTEGRAL SPARK DETECTOR IN FITTING WHICH SUPPORTS IGNITER IN GAS TURBINE ENGINE, Ser. No. 10/775,851;

DETECTING SPARK IN IGNITER OF GAS TURBINE ENGINE BY DETECTING SIGNALS IN GROUNDED RF SHIELDING, Ser. No. 10/775,847; and SPARK IGNITER FOR GAS TURBINE ENGINE, Ser. No. 10/775,846.

FIELD OF THE INVENTION

The invention relates to gas turbine engines, and igniters therein.

BACKGROUND OF THE INVENTION

This Background will explain why the lack of absolute certainty in lifetimes of igniters used in gas turbine aircraft engines can impose significant costs on the owners of the aircraft utilizing the engines.

FIG. 1 is a highly schematic illustration of a gas turbine engine 3, containing a combustor 6. Fuel 9 is sprayed into the combustor. An igniter 12, which functions in a roughly analogous manner to a spark plug in an automobile, produces a spark, or plasma discharge (not shown), which initially ignites the jet fuel.

After initial ignition, the igniter 12 can be repeatedly sparked thereafter, primarily as a safety measure. That is, in a modern engine, under normal circumstances, it is extremely unlikely for a flame-out to occur in the combustor 6. However, unexpected situations, such as an abrupt crosswind, can affect the environment within the combustor, and resulting loss of flame.

In addition, certain flight conditions make the unlikely event of a flame-out slightly more probable. Thus, for example, the igniter 12 may be activated when the aircraft enters a rain squall, or other situation which may disturb steady-state conditions in the combustor 6.

The igniters 12, like all mechanical components, have useful lives which eventually expire, at which time the igniters must be replaced. However, this expiration-and-replacement can create a situation in aircraft which is expensive.

A primary reason is that the approach of an igniter to the end of its lifetime is not marked by readily detectable events. That is, at some point, the igniter completely ceases to generate a plasma, or spark. However, prior to that point, the igniter may sporadically generate sparks.

As explained above, the sparking is not, in general, required to maintain the combustor flame. Consequently, the sporadic sparking would only be noticed if an actual flame-out occurred, and if the sporadic sparking were ineffective to induce a re-light. Since such a combination of events is seen as unlikely, the sporadic sparking is not readily noticed. The impending expiration of the useful life of the igniter is similarly not noticed.

Another reason is that, while all igniters may be constructed as identically as possible, nevertheless, those igniters do not all possess the same lifetimes. Nor do all igniters experience identical events during their lifetimes. Thus, it is not known exactly when a given igniter will expire.

Thus, the point in time when an igniter must be replaced is not known with certainty. One approach to solving this problem is to perform preventative maintenance, by replacing the igniters when they are still functioning. While the cost of a new igniter and the manpower required to install it is not great, the early replacement does impose another cost, which can be significant.

The aircraft in which the igniter is being replaced represents a revenue source measured in thousands of dollars per hour. If the aircraft is rendered nor-functional for, say, two hours during replacement of an igniter, the revenue lost during that time is substantial.

Therefore, the uncertain lifetimes of igniters in gas turbine aircraft engines can impose significant losses in revenue.

SUMMARY OF THE INVENTION

Normal operation of an igniter in a gas turbine engine causes erosion of an insulator inside the igniter. In one form of the invention, an auxiliary ground electrode is embedded within that insulator, and the erosion eventually exposes the auxiliary electrode. The igniter is designed so that the exposure occurs at the time when the igniter should be replaced.

The exposed auxiliary ground electrode can be detected by the fact that, when a spark occurs, a small current travels through the auxiliary ground electrode. When that current is detected, its presence indicates the exposure. Alternately, the exposed auxiliary ground electrode can be visually detected by a human observer, perhaps by using a borescope.

BRIEF DESCRIPTION OF THE DRAWINGS

FIGS. 5 and 6 illustrate changes in geometry of end E which the Inventors have observed.
FIG. 10 is a perspective view of part of FIG. 7.
FIG. 11 is a perspective, cut-away view of one form of the invention.
FIG. 12 is a cross-sectional view of the apparatus of FIG. 11.
FIG. 13 is a perspective view of the apparatus of FIG. 11.
FIG. 15 illustrates a sequence of events occurring in one form of the invention.
FIG. 16 illustrates two distances D9 and D10, over which two electric fields are generated.
FIG. 17 illustrates one mode of constructing auxiliary electrode 72 in FIG. 15.
FIG. 18 illustrates an aircraft which utilizes one form of the invention.
FIG. 19 illustrates igniter 308, bearing an annular coil 310.

FIG. 19A illustrates one form of the invention, wherein a bracket 311 supports the igniter, and also contains a coil 310.

FIG. 20 illustrates an igniter-cable assembly about which is positioned a high-permeability ring 326, about which is wrapped a coil 320.

FIG. 22 is a schematic developed by the Inventors of a possible mode of operation of the apparatus of FIG. 21.

FIG. 23 illustrates a prior-art RLC circuit.

FIGS. 25–28 are plots of simulated output of the circuit of FIG. 24.

FIGS. 30–34 are plots of simulated output of the circuit of FIG. 29.

DETAILED DESCRIPTION OF THE INVENTION

Figure 2:
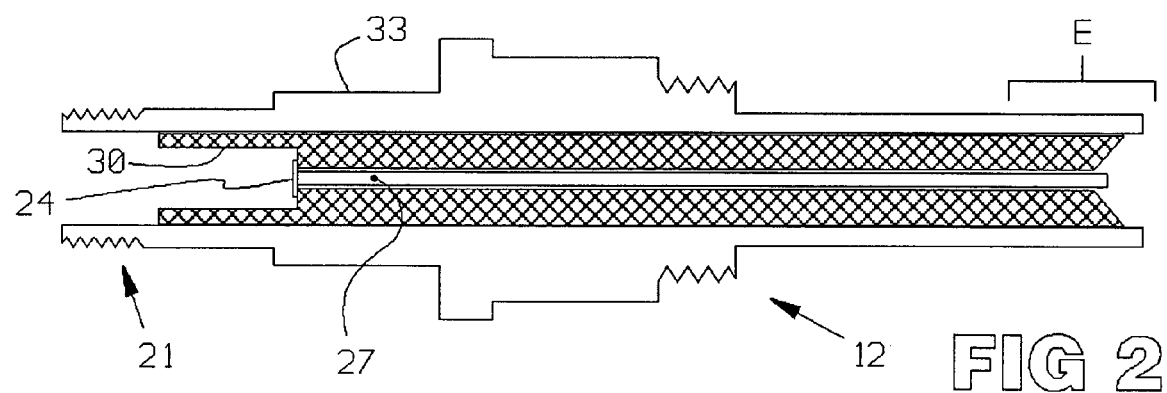
FIG. 2 illustrates an igniter 12, shown in FIG. 1.

FIG. 2 illustrates an igniter 12 used in the prior art. An electrical connector (not shown) is threaded onto threads 21, and contains an electrical contact (not shown) which mates with the end 24 of electrode 27. Insulator 30 isolates electrode 27 from the shell 33 of the igniter 12.

Figure 3:
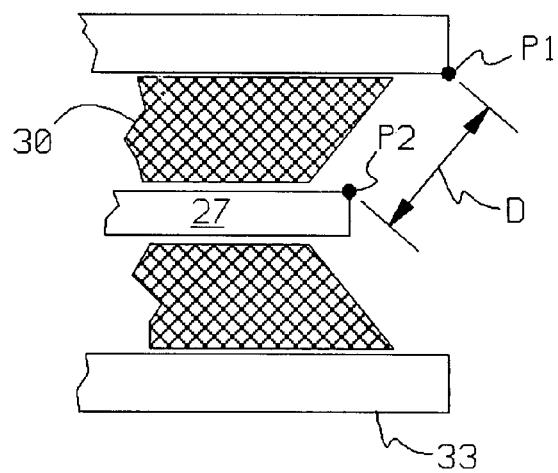
FIGS. 3 and 4 are enlarged views of end E in FIG. 2.
Figure 4:
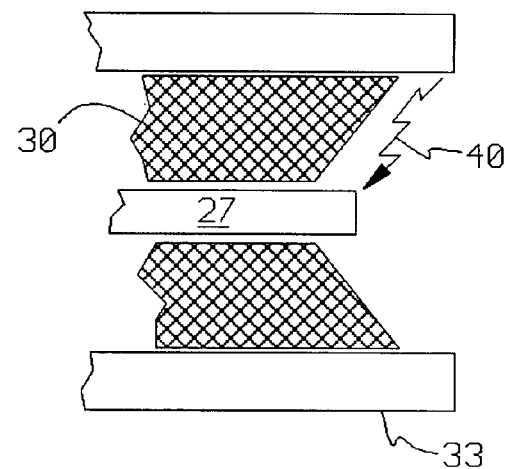

End E of the igniter 12 is shown in FIGS. 3 and 4. A very simplified explanation of the physics involved in plasma generation will be given.

In operation, a high voltage is applied to the electrode 27, thereby creating a voltage difference, or potential difference, V between points P1 and P2 in FIG. 3. The electric field in that region equals the potential difference V divided by the distance D between the points P1 and P2. For example, if the voltage is 20,000 volts and the distance D is 10 millimeters, or 0.01 meter, then the electric field equals 20,000/0.01, or 2 million volts per meter.

The electric field is designed to exceed the dielectric breakdown strength of the material, or medium, lying between points P1 and P2. That material is a mixture of air plus fuel. However, the field does not exceed the breakdown strength of insulator 30, and that strength exceeds that of the air-fuel mixture.

When breakdown occurs, the electric field strips electrons away from the atoms in the medium, producing positively charged ions and free electrons. The electric field drives the free electrons in a direction parallel with the electric field. However, during that movement, those temporarily free electrons will collide with other ions. Also, thermal motion of the ions and electrons will also bring them together in collisions.

In the collisions, the electrons will be captured by the ions, and will drop to a lower energy state, releasing heat and light, in the form of an electric arc which is called a plasma, which is indicated as lightning bolt 40 in FIG. 4. This process continues as long as the electric field is present.

The Inventors have observed one result of the operation just described. As indicated in FIG. 5, the insulator 30 becomes eroded from the phantom shape 50 to the curved shape 53. In addition, the electrode 27 becomes eroded from the phantom shape 56 to the solid shape 59. Corners 33A also become eroded.

The Inventors believe that one or more of the following agencies are responsible for the erosion. One agency is the corrosive nature of the plasma: free electrons are very reactive, and seek to bind to any available atoms or ions which are nearby. Also, the generation of free electrons from oxygen, which is present in the air, creates ionized oxygen, which is also highly reactive.

A third agency is that the plasma creates a high-temperature environment. A high temperature, by definition, represents agitated atoms and molecules with high velocities. High-velocity atoms and molecules react more readily with stationary objects when they collide with the objects.

Possibly a fourth agency is the fact that the plasma generates high-frequency photons, in the ultra-violet, UV, and perhaps into the X-ray regions of the spectrum. It is well known that UV and X-radiation can damage numerous types of material.

Irrespective of the precise causes of the erosion, the erosion illustrated in FIG. 5 eventually causes the igniter 12 to eventually stop functioning. A primary reason is illustrated in FIG. 6. Previously, prior to the erosion, voltage was applied between points P1 and P2 in FIG. 6. However, after the erosion, point P2 has effectively moved to point P3. Distance D has now become longer distance D2. The electric field, which causes the ionization and thus the plasma, is now weaker.

Continuing the example given above, if distance D2 is 20 millimeters, then the electric field becomes 20,000/0.020, or one million volts per meter, half its original value. Eventually, distance D2 becomes so great that the electric field does not reliably exceed the dielectric breakdown strength of the air-fuel mixture, and ionization ceases to occur.

Figure 7:
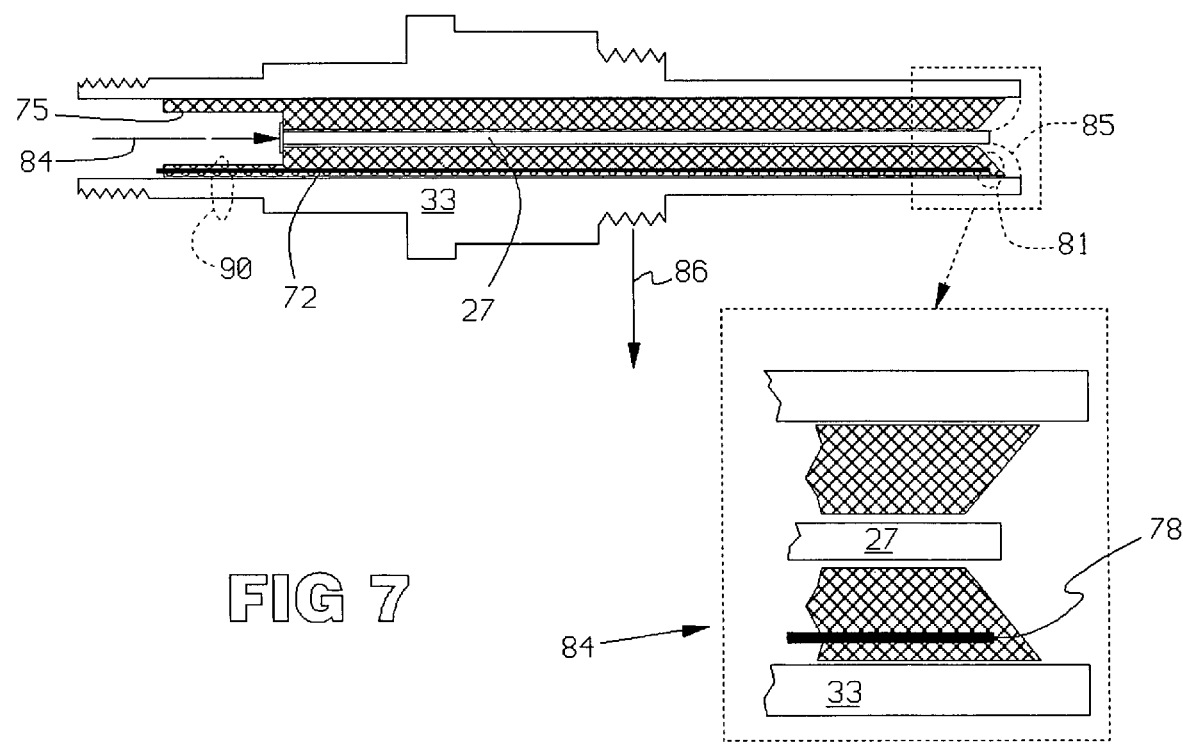
FIG. 7 illustrates one form of the invention.

FIG. 7 illustrates one form of the invention. An auxiliary electrode 72 is embedded in the insulator 75. The tip 78 is covered by the insulator-material in region 81, as indicated by the insert 84. Auxiliary electrode 72 may be connected to the shell 33, as at region 90.

Initially, current enters electrode 27 as indicated by arrow 84, jumps to the shell 33 through the plasma 85, and exits the shell 33 into the engine, through multiple paths, such as through its mounting threads, as indicated by arrow 86.

Figure 8:
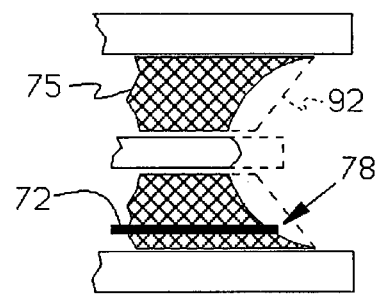
FIGS. 8 and 9 are views resembling insert 84 in FIG. 7.

As erosion occurs, the insulator 75 departs from its initial shape indicated by phantom lines 92 in FIG. 8. Tip 78 of the auxiliary electrode 72 now becomes exposed. Now, when a high voltage is applied to the igniter, two paths exist for a plasma to follow. One is the usual path P5 in FIG. 9. The other path is indicated as P6 of FIG. 9, and runs from the central electrode 27 to the now-exposed auxiliary electrode 72.

Restated, two current-return-paths are available to the central electrode 72. Path P5 runs to the shell 33, in the usual manner. Path P6 runs to the now-exposed auxiliary electrode 72. Eventually, further erosion will lengthen path P5, and cause plasma formation along that path to terminate. That is, path P5 in FIG. 9 initially can be represented by distance D in FIG. 6. After sufficient erosion, path P5 in FIG. 9 will be represented by distance D2 in FIG. 6, and, as explained above, no plasma will be generated along path P5 when distance D2 becomes sufficiently large.

Figure 9:
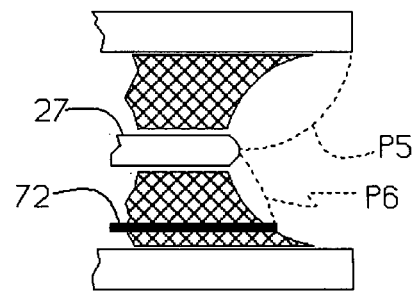

However, auxiliary plasma path P6 is still available in FIG. 9 at this time. A plasma can still be generated, and the lifetime of the igniter has been increased.

The preceding discussion presented the auxiliary electrode 72 in FIG. 7 in the form of a rod. FIG. 10 illustrates such a rod in perspective view, surrounded by insulator 75.

In an alternate embodiment, a cylinder is used. FIG. 11 is a cut-away view of one embodiment. Central electrode 27 is surrounded by an insulator 100, which itself is surrounded by a conductive tube or cylinder 103, which is then surrounded by another layer of insulator 105. FIG. 12 illustrates the system in cross-sectional view, with similar numbering.

FIG. 13 illustrates the insulator 100 in its initial configuration, after manufacture or just after installation. A tip 110 of central electrode 27 is exposed, and surrounded by the conical surface 113 of the insulator 100. Cylindrical auxiliary electrode 103 is embedded within the insulator 100, and no tip or edge is exposed, as indicated by distance D8 in FIG. 12.

Figure 14:
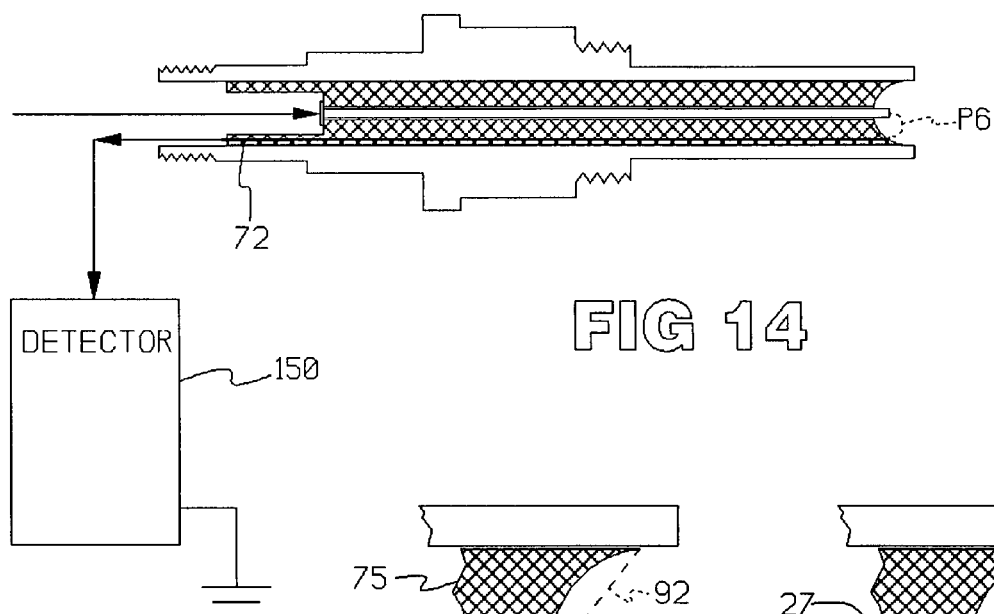
FIG. 14 illustrates one form of the invention.

The preceding discussion stated that the auxiliary electrode 72 may be connected at region 90 in FIG. 7. In another embodiment, the auxiliary electrode 72 of FIG. 14 is also connected to ground, but through a detector 150. Detector 150 looks for a current in auxiliary electrode 72. Current detectors are well known.

If no current is detected, it is inferred that the auxiliary electrode 72 is still embedded within insulator 75, as in FIG. 7, and is electrically isolated from central electrode 27.

In contrast, if a current is detected, it is inferred that the auxiliary electrode has become exposed through erosion, as in FIG. 9. The detected current is attributed to a plasma following path P6. When the current is detected, detector 150 issues a signal, sets a flag, or otherwise indicates the inference that erosion has exposed auxiliary electrode. A human technician at that time, or a prescribed time afterward, replaces the igniter.

An alternate mode of detection is to remove the igniter and visually examine the end corresponding to end E in FIG. 2. If a smooth surface of the insulator 100 is seen, as in FIG. 13, then it is concluded that the igniter is still functional. However, if the auxiliary electrode 72 is seen, as in FIG. 8, then it is concluded that replacement may be required.

In another embodiment, the auxiliary electrode is designed to become exposed, and then to erode rapidly. FIG. 15, viewed left-to-right, illustrates first a newly installed igniter 160. After a period of usage, igniter 165 exposes its auxiliary electrode 72. Now a plasma P6 extends to the auxiliary electrode 72.

However, as stated above, the auxiliary electrode 72 is designed to erode rapidly. For example, as insert 170 indicates, the auxiliary electrode 72 is fabricated with a pointed end. Plasma 6 causes the pointed end to become rapidly eroded, as indicated by the small particles in frame 170. This operation causes a specific sequence of two events.

One is that, when the auxiliary electrode becomes first exposed, a current passes through the it. The current is detected, as by detector 150 in FIG. 14. Next, after the auxiliary electrode fractures or erodes, no current passes through it.

One reason for this sequence is illustrated in FIG. 16. Initially, the voltage V spans distance D9, creating an electric field equal to V/D9. After fracture or erosion, the same voltage V spans distance D10. The electric field equals V/D10, a smaller value. The latter electric field is insufficient to create a plasma, while the former is.

In one embodiment, the occurrence of the two events just described occurs prior to the termination of the lifetime of the igniter. Thus, that termination is signalled by the occurrence of a current through the auxiliary electrode 72, followed by a termination of that current. The onset of the current indicates the approach of the termination of the lifetime, but with time remaining to operate the engine. The subsequent termination of the current indicates that less time remains, and that replacement of the igniter becomes more important.

FIG. 17 illustrates one embodiment of the auxiliary electrode 72. A neck, or groove, 190 is provided, which facilitates the breakage schematically illustrated in the insert 170 in FIG. 15. The groove 190 is a region of mechanical weakness intentionally built into the auxiliary electrode 72. Prior to the erosion indicated in FIG. 8, that weakness is not important, because mechanical support to the electrode is supplied by the insulator 75.

The discussion above stated that a high voltage is applied to electrode 27. It is possible that a low voltage applied to the electrode 27 can accomplish the same function of generating a plasma.

FIG. 18 illustrates another embodiment. An aircraft 300 is powered by gas turbine engines (not shown), which are located within nacelles 305. Each engine contains one, or more, igniters, as discussed above. The igniters may contain an auxiliary electrode, as described above, or may be of the prior-art type.

FIG. 19 illustrates an igniter 308. The invention adds a sensor, such as sensing coil 310. This coil 310 is coaxial with the igniter, as indicated. This particular coaxial arrangement was used in an experiment, to ascertain whether a coil could detect a signal when the igniter 308 produced a spark.

The coaxial arrangement is not necessarily required. In one form of the invention, coil 320 can be arranged as shown in the two rightmost images in FIG. 20. The magnetic field lines B produced by current I in the power cable 315 are concentric with the current which produces the field lines B. Since that current flows though the entire cable 315, and through the igniter 308, the field lines B extend along both the cable 315 and the igniter 308.

According to Faraday's Law, optimal coupling is attained when the coil 320 is perpendicular to the field lines B, as shown in the central image.

In another form of the invention, a high-permeability ring 326, constructed perhaps of transformer iron, is placed about the igniter, or cable 315, and the coil 320 is wrapped about the ring 326. The ring 326 captures the magnetic field lines B, as it were, and delivers them to the coil 320. Under this arrangement, field lines B passing through the ring 326 also pass through the coil 320.

One definition of the term high permeability is that the relative permeability of a high permeability material exceeds 1,000. As a point of reference, the relative permeability of many steels is in the range of 4,000. Materials exist having relative permeabilities approaching one million.

In yet another form of the invention, a prior-art clamp-on current detector (not shown) is used.

The Inventors have found that the coil 310 in FIG. 19, even though lacking the perpendicular characteristic shown in FIG. 20, produced a detectable signal in response to current pulses within the igniter 308. The Inventors offer the following observations concerning this signal, and its detection.

Figure 21:
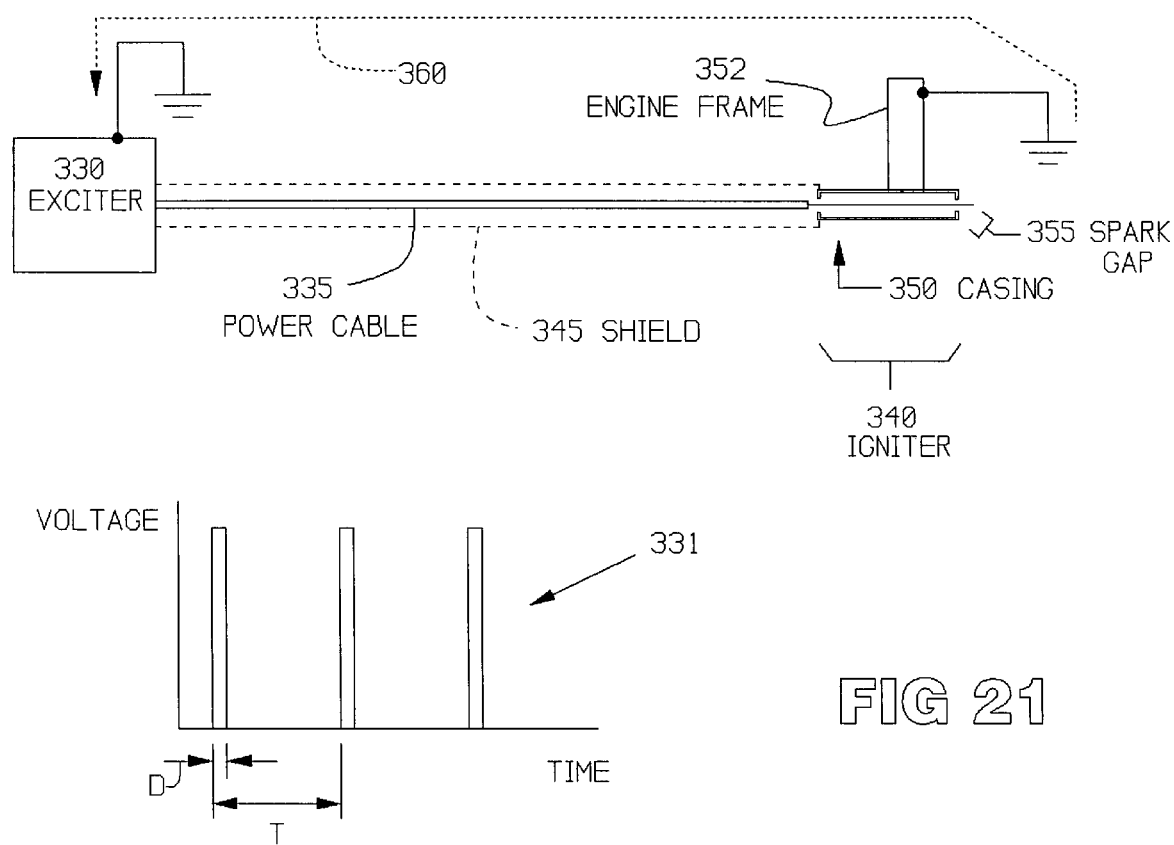
FIG. 21 is a schematic of one view of an igniter system.

FIG. 21 is an electrical schematic of the igniter circuit. Block 330 represents the exciter, which is contained within a conductive housing (not shown). The exciter 330 produces a high-voltage pulse train, to generate spark in the igniter 340.

Power cable 335 delivers the high-voltage current pulses to the igniter 340. One type of high-voltage pulses are in the range of 20,000 volts. One type of frequency of the pulses lies in the range of 10 Hz, that is, ten pulses per second. One type of pulse has a duration of 10 milliseconds. In this example, the duty cycle is thus ten percent (0.10/0.100).

Plot 331 illustrates the pulses just described. Duration D would be 10 milliseconds in this example. Period T would be 100 milliseconds in this example, corresponding to a frequency of 1/T, or 10 pulses per second.

In FIG. 21, a shield 345 surrounds the power cable 335. The shield 345 can take the form of solid conduit, a woven conductive sleeve, a combination of the two, or other types of shielding. This shield 345 is connected to the casing 350 of the igniter 340, and the casing 350 is connected to the frame, or housing, 352 of the engine, which is considered to be a DC ground.

The shield 345 provides electromagnetic interference suppression and also prevents personnel from contacting the high-voltage cable 335. Even though the cable 335 is itself surrounded by a thick insulating cover, the shield 345 provides a redundant safety measure.

Under the arrangement illustrated, the housing (not shown) of the exciter 330, the shield 345, and the casing 350 of the igniter 340 are all connected to the frame 352 of the engine, and are considered to be held at DC ground.

One type of classical analysis of the apparatus shown in FIG. 21 states that the following mechanism can explain the sparking operation. During each high-voltage pulse, of duration D in plot 331, the current provided by the high-voltage cable 335 reaches the spark gap 355, jumps the gap 355, and returns via the frame of the engine, to the exciter 330, along path 360. Under this mechanism, arguments can be mustered indicating that the coil 310 of the type shown in FIG. 19 would be ineffective to detect the current pulses.

A basic argument is that, in theory, coil 310 should detect no current, because no magnetic field lines B, in theory, penetrate the cross-sectional area of the coil 310. Faraday's Law states that such penetration is required.

In considering additional arguments, two cases should be distinguished: the DC case and the AC case. In the DC case, if a DC current is carried by the high-voltage cable 335 in FIG. 21, then static magnetic field lines B of the type shown in FIG. 20 would be present. If the coil is placed around the igniter as shown in FIG. 19, and if the casing 350 of the igniter is constructed of a high-permeability material, such as a type of steel, the casing will trap some, or all, of the B-field, and possibly inhibit detection of the static B-field. It could be said that the shielding, including the casing 350 of the igniter and the shield 345, act as a Faraday cage which contains the static DC magnetic field. Thus, an argument may exist stating that coil 310 in FIG. 19 would not detect the current pulses.

This argument may also apply to slowly varying currents. That is, it is possible that the Faraday cage also blocks slowly changing magnetic fields.

In the AC case, electromagnetic radiation may emanate from the cable 335 and igniter 350 in FIG. 21, particularly because the current pulses contain high-frequency components. High-frequency components, in general, radiate more readily, at least from short antennas of length equal to fractions of a wavelength. The conductivity, as opposed to permeability, of the shield 345 and casing 350 can block radiation produced by the current pulses. In one mechanism, the blockage occurs through reflection: the radiated electromagnetic field induces currents in the shield 345 and casing 350, which radiate their own electromagnetic fields inwardly, toward the cable 335. The radiated fields, in effect, reflect the incoming radiation back to the cable 335.

Also, as stated above, the shield 345 and igniter casing 350 are connected to ground. In theory, those grounded elements shunt all AC signals to ground, and thus prevent them from radiating electromagnetic energy.

Thus, at least the preceding arguments exist which indicate that the coil of FIG. 19 would not be effective to detect current pulses in the cable 335 of FIG. 21.

The Inventors have observed, or postulated, that all the return current may not follow path 360 in FIG. 21. Return current refers to that returning to the exciter 330 after having jumped the spark gap 355. The Inventors surmised that some return current may travel along the shielding system, including the shield 345 and the casing 350 in FIG. 21. FIG. 22 is one representation of this surmise.

Resistor R1 indicates the small resistance of the ground path through the engine frame, from the spark gap 355 to the exciter, and corresponds roughly to path 360 in FIG. 21. Resistor R2 indicates the small resistance of the path from the spark gap 355 to the exciter, but through the shield system. The shield system includes the casing 350 of the igniter and the shield 345. Both R1 and R2 originate at, or near, the spark gap 355, but represent different routes to the exciter 330.

Under this surmise, it is possible that the return current passing through R2 is detectable, despite the arguments given above.

In this context, the Inventors point out that, in general, detecting a return current through the other resistor R1 is considered impractical. Resistor R1 represents, among other things, the engine itself. A simple, accurate, and reliable approach to detecting return current in the engine is not seen as practical, at least for the reason that the number of paths available to the return current is so large, in spanning the entire engine, or a large part of it.

However, the path represented by resistor R2 is a localized, discrete entity, from a current-detection standpoint, and is not contained within a shield. Thus, if a return current pulse is travelling in R2, then the magnetic field, or electromagnetic radiation, produced by the pulse may be detectable, by detecting the current in R2, that is, the current in the shield system.

An experiment was undertaken, using coil 310 in FIG. 19, and it was found that coil 310 produced a detectable signal, when the exciter produced a spark pulse.

It should be observed that the coil 310 may be detecting one, or more, of the following currents. Coil 310 may be detecting the current pulse in the cable 335 in FIG. 21, contrary to the arguments given above: the shielding system may not be completely effective. Alternately, coil 310 in FIG. 19 may be detecting return current pulses in the casing 350 of the igniter, as postulated above. Or coil 310 may be detecting some type of sum or difference of the two currents just identified.

The signal detected in coil 310 was small, so that amplification may be desired. However, the operational environment of the coil 310 provides a challenge in this respect.

During operation of the aircraft 300 of FIG. 18, coil 310 in FIG. 19 will be located in an environment having a temperature exceeding 400 F. That is, the casing 350 of the igniter 308 in FIG. 19, to which the coil 310 is attached or adjacent, exhibits a temperature of at least 400 F during normal operation.

Such a high temperature would cause problems if a solid-state amplifier is to be used to amplify signals produced by coil 310. Nevertheless, with sufficient precautions, an electronic, transistorized amplifier could be used to detect the signals produced by the coil 310.

In one form of the invention, no solid-state amplifier is used, at least not in the vicinity of the 400 degree environment. Instead, a passive amplifier was developed, using only resistive, capacitive, and inductive elements, with no active elements such as transistors or vacuum tubes. One definition of active element is that an active element can amplify power of an input signal: output power can exceed input power. A passive element does not possess that property of power amplification.

It is known that a series RLC circuit, such as that in FIG. 23, can be designed to produce an amplified voltage across the capacitor C under certain conditions. This amplification is discussed in Chapter 13, entitled "Frequency Response," in the text entitled "Engineering Circuit Analysis," by William Hayt and Jack Kemmerly (ISBN 0-07-027410-X, McGraw-Hill, 1993). This text is hereby incorporated by reference.

The conditions for amplification include the following. One, the signal source, Vin, be sinusoidal, and of constant frequency, which is a situation often called sinusoidal steady-state. Two, the values of the capacitor C and inductor L are chosen so that the input impedance seen at points P1 and P2 is purely real, with no reactive components. This condition is called resonance, and the value of the resonance frequency, omega-sub-zero, is indicated in FIG. 23.

Under these conditions, the voltage across the capacitor, Vc, will equal ABS(Q)×Vin, as indicated in FIG. 23, wherein ABS refers to the absolute value, or magnitude, of the Quality factor Q of the circuit. Q is defined as indicated in FIG. 23. Thus, for example, for a Q of 10, a tenfold amplification is attained.

Thus, the prior art indicates that a series RLC circuit can provides voltage amplification to a sine wave input. The text identified above indicates that the dual of a series RLC circuit, namely, a parallel RLC circuit, provides current amplification, as opposed to voltage amplification.

A computer simulation will illustrate the voltage amplification.

Figure 24:
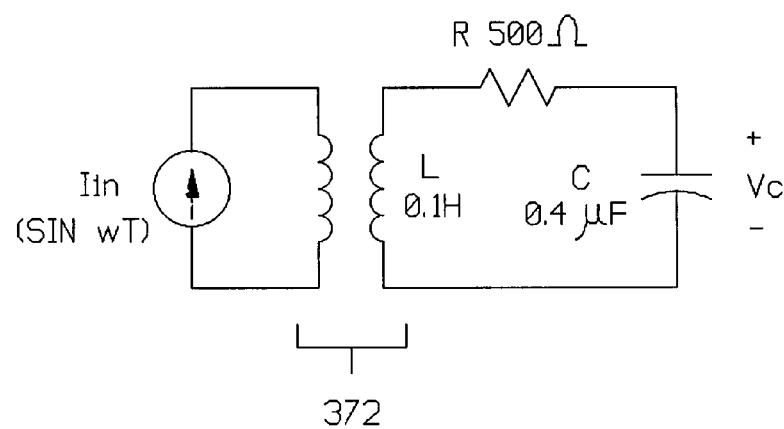
FIG. 24 illustrates an RLC circuit excited by a sinusoidal waveform.

FIG. 24 illustrates a circuit which was simulated using one of the commercially available SPICE programs. The transformer 372 is present, in order to make this circuit consistent with the circuit models of the invention, later discussed. Values of the resistor R, capacitor C, and inductor L are indicated. These values remained constant in all simulations.

FIGS. 25–28 illustrate results of four simulations done on the circuit of FIG. 24. An input signal, Iin in FIG. 24, was applied, in the form of a two-amp peak-to-peak sinusoid, which is shown in the Figures. The frequency of the input signal was changed in each simulation.

In FIG. 25, the input frequency was 50 Hz. The left axis applies to the input signal Iin. The right axis applies to the voltage across the capacitor, Vc, which is indicated in FIG. 25. It is clear that, at 50 Hz, the output Vc is a sinusoid of about 200 volts, peak-to-peak.

In FIG. 26, the input frequency was 750 Hz. It is clear that, at 750 Hz in FIG. 26, output Vc is a sinusoid of about 3,200 volts, peak-to-peak.

The resonance frequency of FIG. 24 is about 2517 Hz, computed using the expression for omega-sub-zero given in FIG. 23. In FIG. 27, the input frequency was 2517 Hz. It is clear that, at 2517 Hz, Vc is a sinusoid of about 32,000 volts, peak-to-peak.

In FIG. 28, the input frequency was 50 kHz, that is, 50,000 Hz. It is clear that, at 50 kHz, Vc is a sinusoid of about 200 volts, peak-to-peak.

FIGS. 25–28 are consistent with the postulate that a series RLC circuit can amplify a steady-state sinusoid. At the resonant frequency, Vc is high, 32,000 volts at resonance, and at other frequencies, Vc is lower. It is emphasized that FIGS. 25–28 do not represent voltages produced by coil 310 in FIG. 19, but capacitor C in FIG. 24, under the assumed conditions.

The Inventors investigated whether an RLC circuit of the type shown in FIG. 24 can produce a similar amplification when the input signal is not a steady-state sinusoid, but a train of pulses of the type used to power the igniters discussed herein. Experimental results indicate an affirmative answer, and the computer simulations to be discussed provide plausibility arguments.

Figure 29:
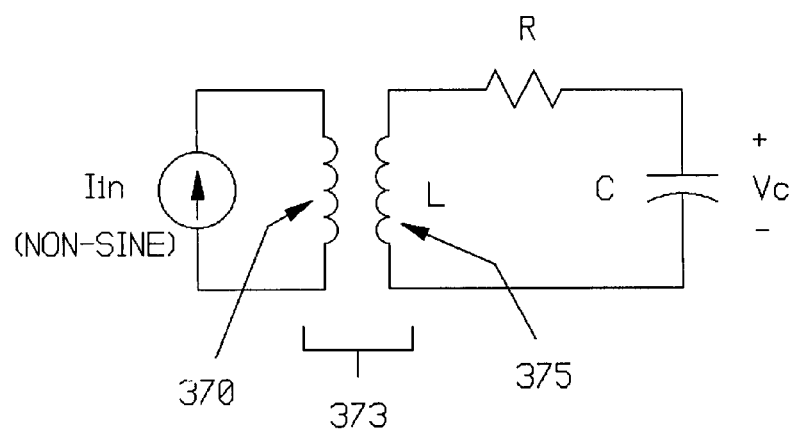
FIG. 29 illustrates an RLC circuit pulsed by a pulse train.

In FIG. 29, coil 370 represents the power cable 315. The power cable is actually a single-turn device, but coil 370 in FIG. 24 is represented as a multi-turn device, in order to emphasize the usage of the power cable as the primary of a transformer 373.

Coil 375 represents the pick-up coil 310 of FIG. 19, but coils resembling coil 320 in FIG. 20 could be used. In FIG. 29, capacitor C and resistor R are elements added to the sensing coil 375, in the pursuit of amplification. It is emphasized that the elements of the circuit of FIG. 29 are chosen to withstand operating temperatures consistent with the environment in which they will be used, particularly temperatures, and also vibration.

The Inventors have found that, for a given pulse train, an artificial resonance frequency can be first computed. Then, in one approach, the artificial resonance frequency is treated as an ordinary sinusoidal steady-state resonance frequency, corresponding to omega-sub-zero in FIG. 23. Using the artificial resonance frequency, values of inductor L and capacitor C are chosen in the usual manner, but recognizing that (1) an artificial resonance frequency is being used and (2) steady-state sinusoidal resonance will not apply. Instead, the L and C values obtained are used with a pulsed input.

In practice, the value of inductor L may be fixed by the materials and geometry of used to construct coil 310 in FIG. 19, so that the only value under control of the designer would be that of capacitor C.

Once the values of L and C are chosen, based on the artificial resonance frequency, it is found that amplification of a pulse train applied to transformer 372 in FIG. 29 can occur.

Alternately, the artificial resonance frequency can be determined graphically, and this will be illustrated by a sequence of examples. FIG. 30 illustrates simulation output of the circuit of FIG. 29, but when excited by the input signal 400 in FIG. 30, which is a triangular current pulse, which is applied to coil 370 in FIG. 24. The component values used in FIG. 25 for the current simulation were the following: R of 500 ohms, L of one Henry, and C of 0.40 microFarads, as indicated in FIG. 30.

The horizontal axis indicates time, in units of milliseconds. As before, the left axis applies to the input signal, and the right axis applies to the output signal, which is the voltage across capacitor C in FIG. 24.

FIG. 30 indicates that the output is a decaying sinusoid which first peaks at about positive 250 volts, at point 405, then peaks at about negative 175 volts, at point 410, and so on. This output response is commonly called an underdamped response in an RLC circuit, and is also called ringing.

FIG. 31 illustrates a simulation using the same triangular input, and the same component values as in FIG. 30, with the exception that capacitor C is one-tenth its previous value, and is now 0.040 microFarads. It is seen that the response frequency increases, consistent with the reduction of the value of C. Further, the amplitude of Vc has increased: it now peaks at about 2.4 kvolts, at point 415.

FIG. 32 illustrates a simulation using the same triangular input, and the same component values as in FIG. 31, with the exception that inductor L has been cut in half, and is now 0.5 Henry. It is seen that the response frequency increases, consistent with the reduction of the value of L. Further, the amplitude of Vc has increased: it now peaks at about 2.8 kvolts, at point 420.

FIG. 33 illustrates a simulation using the same triangular input, and the same component values as in FIG. 32, with the exception that inductor L has been cut to 20 percent of its previous value, and is now 0.1 Henry. It is seen that the response frequency increases, consistent with the reduction of the value of L. Further, the amplitude of Vc has increased: it now peaks at about 3.3 kvolts, at point 425.

FIG. 34 is an expanded view of FIG. 33, spanning from zero to 2.0 milliseconds, and illustrates one concept of the artificial resonance frequency. Time T illustrates the period of the response. The response frequency F, in Hz, is of course 1/T. F is the resonance frequency of the circuit, and is defined in FIG. 24.

FIGS. 30–34 illustrate a graphical approach to selecting an artificial resonance frequency. In a sense, one selects values of L and C to attain an output waveform, as in FIG. 34, wherein the upper half of the first sine wave resembles the input waveform. For example, upper half 425 somewhat resembles the input wave form. Alternately, a more mathematical approach can be used.

In FIG. 34, the value T/2 can be termed the half-period of the circuit's resonance frequency. T/2 is the duration of one positive-going, or one negative-going, hump of the decaying sine wave. The Inventors point out that, in the sequence of FIGS. 30–34, as T/2 of FIG. 34 approaches the duration TT in FIG. 34 of the triangular input pulse, voltage amplification increases. That is, as T/2 approaches duration TT, by changing the values of L and C in FIG. 24, capacitor voltage Vc increases.

This illustrates one approach to setting the artificial resonance frequency. Inductor L and capacitor C are selected so that they produce a resonance frequency having a half-period T/2 equal to the duration TT of the input pulse. But the input is pulsed, or in the case of the simulations of FIGS. 30–34, triangular.

This computation can also be used if the input pulse is a rectangular pulse, and not the triangular pulse shown. The duration of the input pulse, such as D in plot 331 in FIG. 21, is taken as corresponding to duration TT in FIG. 34. Duration D then corresponds to a frequency of 1/D, in Hz. That frequency is taken as the artificial resonance frequency, and the needed L and C are computed, using the equations given in FIG. 23, with suitable conversion to radian measure.

In another approach, the artificial resonance frequency is chosen based on the rise time, or fall time, of the input pulse. In FIG. 34, rise time is about one microsecond, and is the time to rise from point 430 to point 435. The artificial resonance frequency is chosen so that T/4, that is, one-fourth of a period T, equals the rise time. Values for L and C are chosen accordingly.

A similar principle applies to the fall time.

The input pulse may be a rectangular pulse. Of course, the pulse will not be perfectly rectangular: the leading and trailing edges will necessarily have finite rise and fall times. The artificial resonance frequency is chosen so that T/4, namely, the quarter-period time, equals the rise time, analogous to the triangular case.

Figure 1:
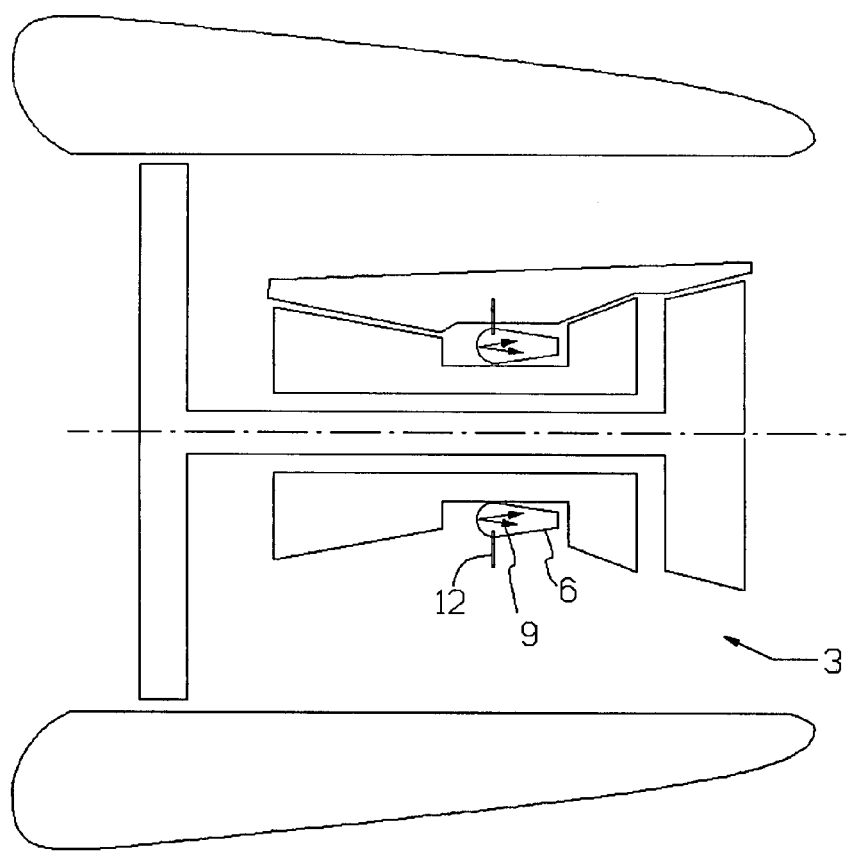
FIG. 1 is a simplified schematic of a gas turbine engine.

It is pointed out that the artificial resonance frequency is largely determined by the period D in FIG. 1. However, period D is not a frequency of the pulse train. Rather, the frequency equals 1/T. Thus, the artificial resonance frequency, and thus the values of L and C computed from that frequency, do not depend completely on the input frequency, but also on the duty cycle of the pulse train.

The preceding approaches discussed selecting an artificial resonance frequency, based on timing of input pulses. In yet another form of the invention, the artificial resonance frequency is determined by trial-and-error. Simulations are run, as by experimenting with the actual circuit shown in FIG. 24, or by using computer software such as SPICE, which simulate that circuit. Various values of L and C are selected, and those providing the desired amplification are then used.

However, the sizes of L and C can be limited by practical considerations. For example, in a given situation, attainment of resonance may require a capacitor which is extremely large in physical size. Thus, in some situations, components can be chosen to provide operation at a non-resonant condition, but still provide adequate amplification.

It is pointed out that the computer simulation approach can be very simple, given that many SPICE programs allow parameters to be swept. That is, in sweeping, a range of values for a parameter, such as L, is selected, and the number of values to be used in the range is specified. In sweeping, literally thousands or millions of different values of L, and also C, can be selected and tested, all using a computer program, with little or no human effort.

A human then examines the results and chooses those desired.

At the artificial frequency, values of L and C are computed which provide specific impedances. Those impedances are the phasor impedances computed as if the excitation were steady-state sinusoidal. That is, at the artificial resonant frequency, the sum of the impedances of L and C are set to zero.

That is, $jwL+1/jwC=0$, wherein
L is the inductance,
C is the capacitance,
w is the pseudo-resonant frequency, and
j is the imaginary operator.

Once w is chosen, L and C are selected to satisfy the equation given in the preceding sentence.

Thus, the desired values of L and C are computed as though the system were operating in a steady-state sinusoidal mode, but then L and C are used in a pulsed input mode.

In addition, the value of R can be important. In one form of the invention, the RLC circuit of FIG. 24 is designed to exhibit an underdamped response, in the engineering sense, so that excitation by a pulse will induce the sinusoidal response called ringing. The envelope of the sinusoidal decays exponentially. The value of R determines the speed of decay. In one form of the invention, R is chosen so that the following events occur.

First, a current pulse generates a spark. That pulse excites the RLC circuit, such as that shown in FIG. 29. The RLC circuit goes into ringing, as indicated in FIGS. 31–34. But the R is selected so that the ringing sinusoid decays sufficiently before the next pulse, so that the next ringing sinusoid can be distinguished from the current one.

Figure 35:
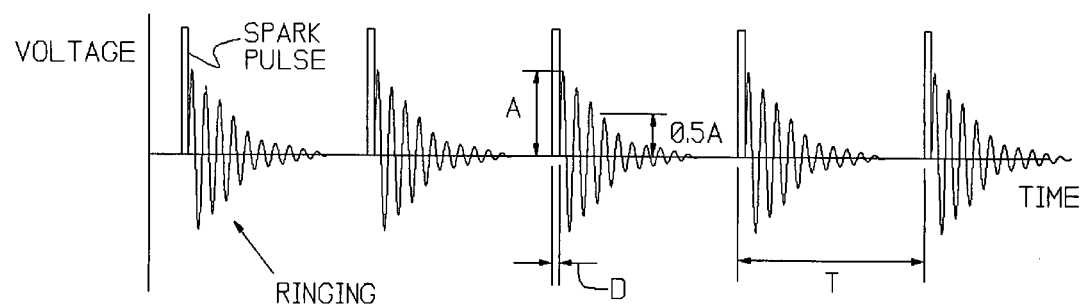
FIG. 35 illustrates timing parameters.

In one embodiment, the ringing sinusoid in FIG. 35 decreases to 50 percent of its original amplitude A within ½ T. Also contemplated is a decrease to 50 percent within any selected time between 0.05 and 0.9 T.

U.S. Pat. No. 5,523,691, Jun. 4, 1996, application Ser. No. 458,091, issued to Frus, illustrates one approach to detecting spark in an igniter in an aircraft engine. Frus states that inductor L1 in his FIG. 1A is first charged by a current. When a normal spark occurs, the inductor L1 rapidly discharges through the IGNITER PLUG.

However, if the IGNITER PLUG does not produce a spark, then the inductor L1 sees the IGNITER PLUG as a very high resistance. In this case, inductor L1 discharges through a resistor contained within voltage divider 27. This latter discharge requires a significantly longer time. Frus detects the length of the discharge, and when the longer discharge is detected, he infers the absence of spark.

Frus also states that spark can fail to occur if the voltage produced by exciter 13 falls short of the intended value. Frus discusses an approach to detecting this failure.

The Inventors point out that the inductor L1 in Frus does not serve a similar purpose to the coil 310 in FIG. 19 herein. For example, Frus' inductor L1 carries current which is delivered to the IGNITER PLUG. In contrast, coil 310 does not do that.

Another difference is that Frus' inductor L1 must be designed to withstand voltages which certainly exceed 1,000 volts, and probably exceed 20,000 volts. Thus, significant insulation is required between the input and output leads extending from the physical inductor L1, as well as around the coiled wire within the device. In contrast, coil 310 of FIG. 19 must withstand a few volts. In one embodiment, coil 310 is designed as an inductor with an operating voltage on its two leads of no more than 5, 10, or 100 volts, in three different embodiments.

In addition, the inductor L1 of Frus does not seem to be present in an environment where the temperature exceeds 400 F.

In one form of the invention, a specific starting sequence is used when the gas turbine engine is started, as in the aircraft shown in FIG. 18. The pilot causes a starting system to rotate the rotor (not shown) of the engine, or orders a control system (not shown) to initiate a start-up routine. A fuel control (not shown) delivers fuel to the combustor. The igniters in the combustors are actuated.

If light-off of the engine is not detected, the pilot then examines an indicator 500 in FIG. 18. Indicator 500 is located at the pilot's station in the aircraft, often called the cockpit. That indicator receives a signal from a detector 505, which responds to the voltage signal produced by capacitor C in FIG. 19, which will be termed a spark signal. If the spark signal indicates that the igniter is producing sparks, then the indicator 500 indicates the presence of spark, as by producing a light. If the spark signal is absent, then the indicator 500 indicates the absence of spark, as by producing no light.

From another perspective, the indicator 500 operates oppositely to an analogous indicator in an automobile. The oil-pressure indicator light in an automobile, for example, illuminates when a problem occurs. In contrast, the indicator 500 illuminates when a problem is absent, namely, when the igniter is producing spark.

A switch 510 can be provided, to allow the pilot to turn off the indicator 500 when knowledge of spark is not desired. Alternately, a control system, not shown, can control when the indicator 500 displays its information.

Figure 36:
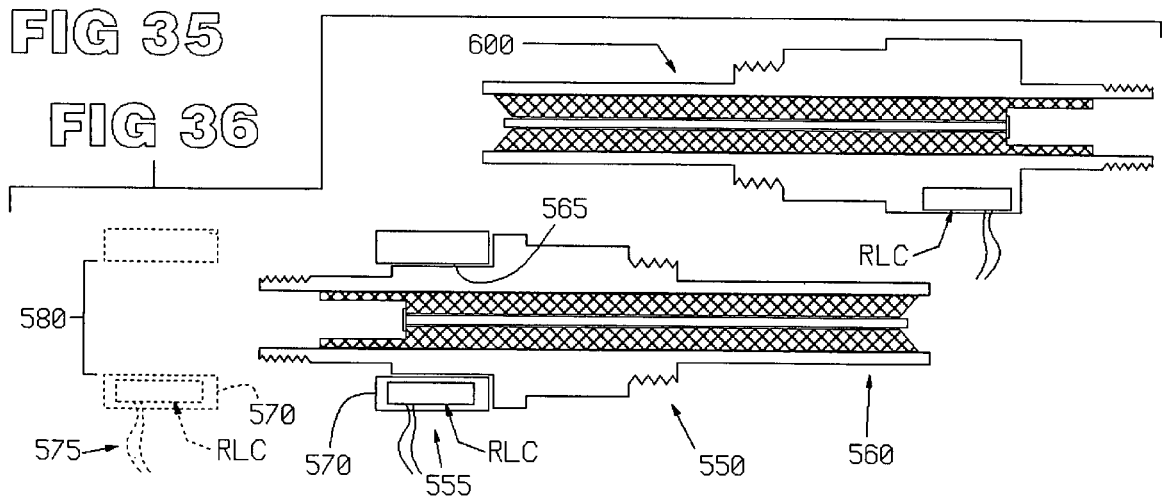
FIG. 36 illustrates two forms of the invention.

FIG. 36 illustrates two forms of the invention. The igniter 550 has a proximal end 555 and a distal end 560. The proximal end has a housing 565, which, in this instance, is of cylindrical shape, or circular shape in cross-section Other cross-sectional shapes are possible.

A detachable housing 570 is shown, which contains coil L, capacitor C, and resistor R, analogous to the corresponding elements in FIG. 29, and indicated by block RLC. Connectors, wiring leads, coaxial cable 575 or the like allow external detection of a voltage across capacitor C, or other selected component.

Housing 570 contains an aperture 580 of a cross-sectional shape which matches that of the housing 565. Matching shape means that the two shapes are the same shape, and the same size, so that the aperture 580 fits snugly about the housing 565.

In one form of the invention, the inductor L is wrapped about the axis of the igniter, as in FIG. 19. In another form of the invention, a high-permeability ring surrounds the igniter, and captures the magnetic field B produced by current entering the igniter. The inductor L is wrapped around the ring, as in FIG. 20.

In another form of the invention, the spark detector RLC is made integral with the igniter, as shown in igniter 600 in FIG. 36.

Several additional aspects of the invention are the following. In one form of the invention, an adapter 311 in FIG. 19A is provided which mounts to the engine or combustor (neither shown). The igniter threads into the adapter. The adapter contains integral coils 310 which perform the detection function described above.

It is not necessary that the RLC circuit operate at resonance. Rather, the RLC circuit can be viewed as performing two functions. One is that it amplifies the pulse generated in the inductor, L. A second is that the RLC circuit produces ringing, or a decaying sinusoid. The ringing causes the detected signal to persist over a longer time than the pulse inducing the ringing, thereby making the pulse easier to detect.

The triangular wave shown for example in FIG. 34 is diagrammatic. The actual signal used in the igniter need not be triangular, but will depend on the requirements of the particular igniter used. Also, the physical properties of the igniter change as it ages, and those properties affect the shape of the pulse applied to it. By analogy, it is well known that, in a capacitor, the current is not in phase with an applied AC voltage. The internal resistance of the capacitor may change with age. That change will cause a change in the phase angle between the current and the voltage, thus illustrating the point that a change in a physical object to which a voltage is applied can change the resulting current in the object.

The discussion herein was framed in terms of discrete, lumped circuit elements, such as the R, L and C in FIG. 24. However, it is observed that similar results can be obtained with distributed elements.

The application to gas turbine engines in aircraft discussed above is exemplary. In general, the invention is applicable to gas turbines generally, which are used in aircraft, land vehicles, ships, power generation, and other applications. Further, the invention is applicable to spark detection in igniters generally.

A bleed resistor can be added to bleed charge from capacitor C in FIG. 24, and the corresponding capacitor in the RLC circuit. The bleed resistor sharpens the decay of the ringing, thus causing the ringing to die out faster.

In general, the values of R, L, and C are chosen to provide a detectable signal, such as on capacitor C. One definition of detectable signal can be obtained with reference to K-type thermocouples, which are used extensively in gas turbine engines. Such thermocouples produce signals in the range of 250 millivolts. Thus, one definition of a detectable signal can be a signal exceeding 250 millivolts. Consistent with that definition, in one experiment, the inventors obtained a signal of 470 millivolts across the capacitor C.

One feature of the invention is that it allows the capacitor in the RLC circuit to be positioned remotely from the other components, and thus in a cooler location than the location of the coil 310 in FIG. 19. In one embodiment, the capacitor C can be positioned in a room-temperature environment, or cooler, where room temperature is taken as nominally 75 degrees F.

This can be significant because many capacitors have a practical temperature limit of 175 degrees F. But the location of coil 310 in FIG. 19 will probably exceed 400 degrees F.

The discussion above referred to delivering a signal indicating proper spark is occurring to a pilot station. This signal could also be delivered to maintenance personnel, either in the apparatus which utilizes the gas turbine engine, or to remote maintenance personnel. The signal can also be delivered to more than one pilot station.

Numerous substitutions and modifications can be undertaken without departing from the true spirit and scope of the invention. For example, the discussion above was framed in terms of aircraft gas turbine engines. However, the invention can be used in other types of gas turbines, such as land-based gas turbine engines used in power generation and pumping, or in ships. In addition, the invention is not restricted to gas turbine engines, but can be used in igniters generally, which are used in various combustion applications.

Also, it is not required that the invention be operated in a hot environment, but the invention does provide the ability to withstand high-temperatures, as explained above.

What is desired to be secured by Letters Patent is the invention as defined in the following claims.

The invention claimed is:

1. A method of detecting spark in an igniter in a gas turbine engine, comprising:
    a) providing a transformer having
        i) a primary which carries igniter current and
        ii) a secondary of inductance L;
    b) connecting the secondary in series with a resistance R and capacitance C; and
    c) inferring presence of spark by detecting signals in capacitance C,
    wherein a cable connects to the igniter, the cable and the igniter are surrounded by an conductive electrical shield connected to an engine frame, and the secondary comprises a coil wrapped around part of the shield, wherein the core of the coil comprises said part.

2. Method according to claim 1, wherein the capacitor capacitance C produces a decaying oscillating signal in response to spark.

3. Apparatus, comprising:
    a) an igniter which is effective to reliably ignite fuel in a gas turbine engine;
    b) a coil, comprising an inductor, which is adjacent a housing of the igniter, which produces signals when sparks are generated in the igniter;
    c) a capacitor in series with the inductor;
    d) a resistor in series with the capacitor;
    wherein the capacitor, the resistor, and the coil form an RLC circuit which amplifies a signal in the coil, and
    wherein a cable connects to the igniter, the cable and the igniter are surrounded by an conductive electrical shield connected to an engine frame, and the coil is wrapped around part of the shield, wherein the core of the coil comprises said part, and the coil comprises a secondary of a transformer for delivering current to the igniter.

4. Apparatus according to claim 3, wherein the housing is conductive.

5. Apparatus according to claim 4, wherein the housing is connected to a system ground.

6. Apparatus according to claim 3, wherein the housing acts as a grounded shield which prevents personnel from contacting high voltages used by the igniter.

7. Apparatus according to claim 6, wherein (1) the grounded shield surrounds a conductor, (2) the conductor carries incoming current to a spark gap in the igniter, (3) the grounded shield carries return current from the spark gap, which is less than the incoming current, so that (4) magnetic fields of the incoming current do not cancel completely magnetic fields of the return current, thereby providing a net magnetic field for the coil to detect.

8. Apparatus according to claim 3, wherein the capacitor produces a decaying oscillating signal in response to spark.

9. Apparatus for detecting spark in an igniter in a gas turbine engine, comprising:
    a) a transformer having
        i) a primary which carries igniter current and
        ii) a secondary of inductance L;
    b) a resistance R and capacitance C in series with the inductance L; and
    c) a detector for inferring spark by detecting signals in capacitance C,
    wherein a cable connects to the igniter, the cable and the igniter are surrounded by an conductive electrical shield connected to an engine frame, and the secondary comprises a coil wrapped around part of the shield, wherein the core of the coil comprises said part.

10. Apparatus, comprising:
    a) a gas turbine engine having a frame or casing having a potential defined as DC ground;
    b) an igniter in the engine;
    c) a supply cable which supplies current pulses to the igniter;
    d) a conductive shield around the supply cable, which connects to a housing of the igniter, wherein the shield and the housing are connected to said ground potential;
    e) an exciter which provides said current to the igniter, and which receives return current from the igniter through
        i) said shield, and
        ii) a second path;
    f) a detector comprising a coil and adjacent said housing, which detects one or more of the following:
        i) current pulses in the cable;
        ii) current pulses in the housing; or
        iii) differential between current pulses in the cable and current pulses in the housing.

11. Apparatus according to claim 10, wherein the coil comprises an inductance L, and further comprising:
    g) resistance R and capacitance C which, together with the coil, form an RLC circuit.

12. Apparatus according to claim 11, wherein the capacitance C in the RLC circuit produces a signal voltage exceeding 50 millivolts in response to each current pulse.

* * * * *